United States Patent
Wild et al.

(10) Patent No.: US 10,608,255 B2
(45) Date of Patent: Mar. 31, 2020

(54) USE OF THIANTHRENE-CONTAINING POLYMERS AS A CHARGE STORE

(71) Applicant: Evonik Operations GmbH, Essen (DE)

(72) Inventors: Andreas Wild, Haltern am See (DE); Ulrich Schubert, Jena (DE); Bernhard Häupler, Hof (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 16/306,614

(22) PCT Filed: Aug. 4, 2017

(86) PCT No.: PCT/EP2017/069843
§ 371 (c)(1),
(2) Date: Dec. 3, 2018

(87) PCT Pub. No.: WO2018/024901
PCT Pub. Date: Feb. 8, 2018

(65) Prior Publication Data
US 2019/0229335 A1 Jul. 25, 2019

(30) Foreign Application Priority Data
Aug. 5, 2016 (EP) .................................. 16182964

(51) Int. Cl.
*H01M 4/60* (2006.01)
*C08F 12/30* (2006.01)
(Continued)

(52) U.S. Cl.
CPC ............. *H01M 4/608* (2013.01); *C08F 12/30* (2013.01); *C08F 112/14* (2013.01);
(Continued)

(58) Field of Classification Search
None
See application file for complete search history.

(56) References Cited

U.S. PATENT DOCUMENTS 5,858,573 A * 1/1999 Abraham ................ H01M 2/34
29/623.1
9,890,230 B2 2/2018 Haeupler et al.
(Continued)

FOREIGN PATENT DOCUMENTS

| CN | 102683744 | 9/2012 |
|----|-----------|--------|
| DE | 35 20 102 | 12/1986 |

(Continued)

OTHER PUBLICATIONS

U.S. Pat. No. 9,890,230, Feb. 13, 2018, 2017/0114162, Haeupler et al.
(Continued)

*Primary Examiner* — Katie L. Hammer
(74) *Attorney, Agent, or Firm* — Grüneberg and Myers PLLC

(57) ABSTRACT

The present invention relates to the use of a thianthrene-containing polymer as redox-active electrode material, for example as an electrode slurry, for electrical charge storage means, especially secondary batteries. It additionally also relates to the electrode material comprising the polymer, and to an electrode and an electrical charge storage means comprising the polymer.

16 Claims, 2 Drawing Sheets

Figure 1:
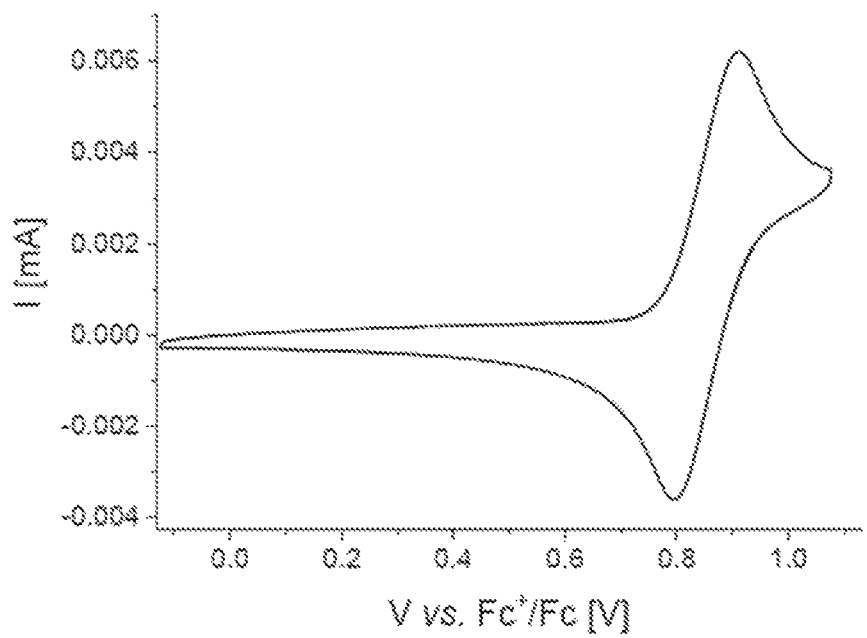

(51) Int. Cl.
  H01M 4/62 (2006.01)
  H01M 4/04 (2006.01)
  C09D 125/18 (2006.01)
  C08F 212/14 (2006.01)
  C08F 112/14 (2006.01)
  H01M 4/137 (2010.01)

(52) U.S. Cl.
  CPC .......... *C08F 212/14* (2013.01); *C09D 125/18* (2013.01); *H01M 4/0402* (2013.01); *H01M 4/137* (2013.01); *H01M 4/604* (2013.01); *H01M 4/623* (2013.01); *H01M 4/625* (2013.01)

(56) References Cited

U.S. PATENT DOCUMENTS

| | | |
|---|---|---|
| 10,103,384 B2 | 10/2018 | Haeupler et al. |
| 2002/0041995 A1 | 4/2002 | Bannai et al. |
| 2002/0041996 A1 | 4/2002 | Morioka et al. |
| 2003/0062080 A1 | 4/2003 | Satoh et al. |
| 2003/0080322 A1 | 5/2003 | Farrand et al. |
| 2004/0214091 A1 | 10/2004 | Lim et al. |
| 2005/0260500 A1 | 11/2005 | Iwasa et al. |
| 2006/0292452 A1 | 12/2006 | Utsugi et al. |
| 2007/0154815 A1 | 7/2007 | Kawasaki et al. |
| 2008/0051463 A1 | 2/2008 | Gerlach et al. |
| 2010/0167129 A1 | 7/2010 | Wu et al. |
| 2010/0221646 A1 | 9/2010 | Kawamonzen et al. |
| 2010/0255372 A1 | 10/2010 | Suguro et al. |
| 2011/0006294 A1 | 1/2011 | Tanaka et al. |
| 2011/0030555 A1 | 2/2011 | Jonschker et al. |
| 2011/0129730 A1 | 6/2011 | Kasai et al. |
| 2011/0183263 A1 | 7/2011 | Takahashi et al. |
| 2012/0095179 A1 | 4/2012 | Nishide et al. |
| 2012/0100437 A1 | 4/2012 | Nakahara et al. |
| 2012/0171561 A1 | 7/2012 | Iwasa et al. |
| 2012/0189919 A1 | 7/2012 | Abe et al. |
| 2013/0183782 A1 | 7/2013 | Mima |
| 2013/0189571 A1 | 7/2013 | Abouimrane et al. |
| 2013/0209878 A1 | 8/2013 | Nakahara et al. |
| 2013/0271090 A1 | 10/2013 | Hunter et al. |
| 2014/0038036 A1 | 2/2014 | Nishide et al. |
| 2014/0048786 A1 | 2/2014 | Suzuka et al. |
| 2014/0057167 A1 | 2/2014 | Kasai et al. |
| 2014/0061532 A1 | 3/2014 | Nishide et al. |
| 2014/0079984 A1 | 3/2014 | Kajitani et al. |
| 2014/0087235 A1 | 3/2014 | Kajitani et al. |
| 2016/0233509 A1 | 8/2016 | Haeupler et al. |
| 2017/0058062 A1 | 3/2017 | Schubert et al. |
| 2017/0062825 A1 | 3/2017 | Schubert et al. |
| 2017/0062842 A1* | 3/2017 | Huang ................ C07D 279/22 |
| 2017/0114162 A1 | 4/2017 | Haeupler et al. |
| 2017/0179525 A1 | 6/2017 | Haeupler et al. |
| 2018/0102541 A1 | 4/2018 | Schubert et al. |
| 2018/0108911 A1 | 4/2018 | Schubert et al. |
| 2019/0016676 A1 | 1/2019 | Schmidt et al. |

FOREIGN PATENT DOCUMENTS

| | | |
|---|---|---|
| DE | 195 32 574 | 3/1997 |
| DE | 197 33 882 | 2/1999 |
| DE | 698 37 190 T2 | 12/2007 |
| EP | 0 320 954 | 6/1989 |
| EP | 0 825 663 | 2/1998 |
| EP | 0 924 782 | 6/1999 |
| EP | 1 128 453 | 8/2001 |
| JP | 2001-307738 | 11/2001 |
| JP | 2002-117852 | 4/2002 |
| JP | 2002-117854 | 4/2002 |
| JP | 2002-117855 | 4/2002 |
| JP | 2004-179169 | 6/2004 |
| JP | 2004-259618 | 9/2004 |
| JP | 2005-203341 | 7/2005 |
| JP | 2005-203342 | 7/2005 |
| JP | 2005-203343 | 7/2005 |
| JP | 2006-156314 | 6/2006 |
| JP | 2006-156315 | 6/2006 |
| JP | 2008-218326 | 9/2008 |
| JP | 2008-234909 | 10/2008 |
| JP | 2009-70827 | 4/2009 |
| JP | 2009-205918 | 9/2009 |
| JP | 2009-217992 | 9/2009 |
| JP | 2009-230951 | 10/2009 |
| JP | 2009-238612 | 10/2009 |
| JP | 2009-298873 | 12/2009 |
| JP | 2010-55923 | 3/2010 |
| JP | 2010-114042 | 5/2010 |
| JP | 2010-163551 | 7/2010 |
| JP | 2010-212152 | 9/2010 |
| JP | 2010-238403 | 10/2010 |
| JP | 2011-40311 | 2/2011 |
| JP | 2011-74317 | 4/2011 |
| JP | 2011-165433 | 8/2011 |
| JP | 2011-252106 | 12/2011 |
| JP | 2012-79639 | 4/2012 |
| JP | 2012-177057 | 9/2012 |
| JP | 2012-190545 | 10/2012 |
| JP | 2012-219109 | 11/2012 |
| JP | 2012-221574 | 11/2012 |
| JP | 2012-221575 | 11/2012 |
| JP | 2013-87256 | 5/2013 |
| JP | 2013-116949 | 6/2013 |
| WO | 2004/077593 | 9/2004 |
| WO | 2005/057715 | 6/2005 |
| WO | 2007/141913 | 12/2007 |
| WO | 2008/099557 | 8/2008 |
| WO | 2009/038125 | 3/2009 |
| WO | 2009/106198 | 9/2009 |
| WO | 2009/145225 | 12/2009 |
| WO | 2010/002002 | 1/2010 |
| WO | 2010/096404 | 8/2010 |
| WO | 2010/104002 | 9/2010 |
| WO | 2010/140512 | 12/2010 |
| WO | 2011/034117 | 3/2011 |
| WO | 2011/068217 | 6/2011 |
| WO | 2011/149970 | 12/2011 |
| WO | 2012/029556 | 3/2012 |
| WO | 2012/120929 | 9/2012 |
| WO | 2012/133202 | 10/2012 |
| WO | 2012/133204 | 10/2012 |
| WO | 2012/153865 | 11/2012 |
| WO | 2012/153866 | 11/2012 |
| WO | 2012/172177 | 12/2012 |
| WO | 2013/099567 | 7/2013 |

OTHER PUBLICATIONS

U.S. Pat. No. 10,103,384, Oct. 16, 2018, 2016/0233509, Haeupler et al.
U.S. Appl. No. 15/129,910, filed Sep. 28, 2016, 2017/0179525, Haeupler et al.
U.S. Appl. No. 15/247,346, filed Aug. 25, 2016, 2017/0062825, Schubert et al.
U.S. Appl. No. 15/247,434, filed Aug. 25, 2016, 2017/0058062, Schubert et al.
U.S. Appl. No. 15/568,871, filed Oct. 24, 2017, 2018/0102541, Schubert et al.
U.S. Appl. No. 15/568,884, filed Oct. 24, 2017, 2018/0108911, Schubert et al.
U.S. Appl. No. 16/065,895, filed Jun. 25, 2018, 2019/0016676, Schmidt et al.
U.S. Appl. No. 16/306,192, filed Nov. 30, 2018, Christian Meier.
International Search Report dated Sep. 22, 2017 in PCT/EP2017/069843.
Written Opinion dated Sep. 22, 2017 in PCT/EP2017/069843.
Bizzarri et al, "*Synthesis and Conductivity of Thianthrene-Type Polymers,*" Mol. Cryst. Liq. Cryst. 1985, vol. 118, 245-248.
Dunn et al., "*Synthesis and Conductivity of Poly Acene Quinone Radical Polymers,*" Journal of Polymer Science: Polymer Physics Edition, vol. 22, 2243-2260 (1984).

(56) References Cited

OTHER PUBLICATIONS

Hopff et al., "*Über 2-Vinylthiantren und seine Polymerisationsprodukte*,", Aus dem Technisch-Chemischen Laboratorium der Eidgenössischen Technischen Hochschule Zürich, Dec. 10, 1962, with translation, 24 pages.

Janoschka, et al., "*Stromspeicher: Radikal organisch*," Nachrichten aus der Chemie, 60, Jul./Aug. 2012, with translation, 11 pages.

Nesvadba et al., "*Synthesis of a polymeric 2,5-di-t-butyl-1,4-dialkoxybenzene and its evaluation as a novel cathode material*," Synthetic Metals 161 (2011) 259-262 DOI:10.1016/j.synthmet.2010.11.030.

Odom et al., "*A fast, inexpensive method for predicting overcharge performance in lithium-ion batteries*," Energy Environ. Sci. 2014, 7, 760-767 DOI: 10.1039/c3ee42305k.

Speer et al., "*Thianthrene-functionalized polynorbornenes as high-voltage materials for organic cathode-based dual-ion batteries*," Chem. Commun. 2015, 51, 15261-15264 XP-002764789.

Suzuki et al, "*Synthesis and characterization of thianthrene-based poly(phenylene sulfide)s with high refractive index over 1.8*," J. Mater. Chem. 2011, 21, 15727-15731.

Vlad, et al. "*Melt-Polymerization of TEMPO Methacrylates with Nano Carbons Enables Superior Battery Materials*," ChemSusChem 2015, 8, 1692-1696 DOI: 10.1002/cssc.201500246.

Weng et al., "*Smart Polymeric Cathode Material with Intrinsic Overcharge Protection Based on a 2,5-Di-tert-butyl-1,4-dimethoxybenzene Core Structure*," Adv. Funct. Mater. 2012, 22, 4485-4492 DOI: 10.1002/adfm.201200458.

Wild et al., "*All-Organic Battery Composed of Thianthrene- and TCAQ-Based Polymers*," Adv. Energy Mater. 2016, 1601415, 9 pages DOI: 10.1002/aenm.201601415.

Yamamoto et al., "*Oligomeric poly(phenazine-2,7-diyl) and its electrochemical response*," Journal of Electroanalytical Chemistry 460 (1999) 242-244.

\* cited by examiner

USE OF THIANTHRENE-CONTAINING POLYMERS AS A CHARGE STORE

This application is a National Stage entry under § 371 of international Application No. PCT/EP2017/069843, filed on Aug. 4, 2017, and claims priority to European Patent Application No. 16182964.3, filed on Aug. 5, 2016, the entire contents of which are hereby incorporated by reference.

The present invention relates to the use of a thianthrene-containing polymer as redox-active electrode material, for example as an electrode slurry, for electrical charge storage means, especially secondary batteries. It additionally also relates to the electrode material comprising the polymer, and to an electrode and an electrical charge storage means comprising the polymer.

BACKGROUND OF THE INVENTION

Organic batteries are electrochemical cells which use an organic redox-active compound as active electrode material for storing electrical charge. These secondary batteries are notable for their exceptional properties, such as fast chargeability, long lifetime, low weight, high flexibility and ease of processibility. A multitude of different organic polymeric structures are already known as active electrode materials for charge storage. For instance, the following publications describe polymers comprising organic nitroxide radicals as active units for charge storage: WO 2012/133202 A1, WO 2012/133204 A1, WO 2012/120929 A1, WO 2012/153866 A1, WO 2012/153865 A1, JP 2012-221574 A, JP 2012-221575 A, JP 2012-219109 A, JP 2012-079639 A, WO 2012/029556 A1, WO 2012/153865 A1, JP 2011-252106 A, JP 2011-074317 A, JP 2011-165433 A, WO 2011/034117 A1, WO 2010/140512 A1, WO 2010/104002 A1, JP 2010-238403 A, JP 2010-163551 A, JP 2010-114042 A, WO 2010/002002 A1, WO 2009/038125 A1, JP 2009-298873 A, WO 2004/077593 A1, WO 2009/145225 A1, JP 2009-238612 A, JP 2009-230951 A, JP 2009-205918 A, JP 2008-234909 A, JP 2008-218326 A, WO 2008/099557 A1, WO 2007/141913 A1, US 2002/0041995 A1, EP 1 128 453 A2, A, Vlad, J. Rolland, G. Hauffman, B. Ernould, J. F. Gohy, ChemSusChem 2015, 8, 1692-1696. US 2002/0041995 A1 and JP 2002-117852 A describe examples of polymeric compounds having organic phenoxyl radicals or galvinoxyl radicals.

Other known active units for charge storage are polymeric compounds having quinones (JP 2009-217992 A, WO 2013/099567 A1, WO 2011/068217 A1), having diones (JP 2010-212152 A), and having dicyanodiimines (JP 2012-190545 A, JP 2010-55923 A).

Other publications describe the use of dialkoxybenzene derivatives as "redox-shuttle" additives for Li ion batteries (WO 2011/149970 A2) and polymers comprising dialkoxybenzene as electrical charge storage means (P. Nesvadba, L. B. Folger, P. Maire, P. Novak, Synth.Met. 2011, 161, 259-262; W. Weng, Z. C. Zhang, A. Abouimrane, P. C. Redfern, L. A. Curtiss, K. Amine, Adv. Funct. Mater. 2012, 22, 4485-4492).

In addition, there exists a further substance class of polymers comprising thianthrene units. These have been described for various technical fields, for example as networks for gas storage and materials having high refractive index. Corresponding publications/patents are, for example: P. C. Bizzarri, C. Dellacasa, Mol. Cryst. Liq. Cryst. 1985, 118, 245-248; L. C. Dunn, W. T. Ford, N. Hilal, P. S. Vijayakumar, H. A. Pohl, J. Polym, Sci. Pol. Phys. 1984, 22, 2243-2260; T. Yamamoto, T. Okuda, J. Electroanal. Chem. 1999, 460, 242-244; Y. Suzuki, K. Murakami, S. Ando, T. Higashihara, M. Ueda, J. Mater. Chem. 2011, 21, 15727-15731; WO 2009/106198 A1, DE 19733882 A1, JP 2012-177057 A, DE 3520102 A1, JP 2012-177057 A, DE 19532574 A1, DE 19733882 C2, WO 2012/172177 A1. In most of the thianthrene-containing polymers described in the prior art, the thianthrene structure is in the main chain. Other publications describe polymers which bear the thianthrene unit in the side chain. Most of these publications discuss the high refractive indices of these polymers (EP 0 320 954 A2, WO 2012/172177 A1 US 2011/0183263 A1, H. Hopif, H. Gutenberg, Makromolekul. Chem. 1963, 60, 129-138).

Non-polymeric thianthrene derivatives have also been used as additives for lithium ion batteries in order to prevent overcharging of the lithium ion battery (U.S. Pat. No. 5,858,573 A, WO 2010/096404 A2, EP 0 825 663 A2, S. A. Odom, S. Ergun, P. P. Poudel, S. R. Parkin, Energ. Environ. Sci. 2014, 7, 760-767) or in order to increase the thermal stability thereof (JP 2001-307738 A). In addition, the thianthrene radical has been used as a non-polymeric compound for charge storage (US 2002/0041995 A1).

The publication by M. E. Speer, M. Kolek, J. J. Jassoy, J. Heine, M. Winter, P. M. Bieker, B. Esser, Chem. Commun. 2015, 51, 15261-15264 (abbreviated hereinafter to "Speer et al.") describes polymers which have thianthrene units in the side chain and norbornenyl units in the main chain and find use as active materials in electrical working memory. These thianthrene-containing polymers feature a higher redox potential compared to other organic cathode materials, since they permit a higher voltage, for example, compared to the nitroxide-based batteries.

However, it has been observed that the thianthrene-containing polymers described by Speer et at. have low cycling stability and a low capacity. This automatically leads to a low specific energy.

The problem addressed by the present invention was therefore that of providing polymers which have a higher capacity and higher cycling stability compared to the thianthrene-containing polymers described in the prior art. Thianthrene-containing polymers which solve the aforementioned problem have now been developed.

DETAILED DESCRIPTION OF THE INVENTION 1.1) The Present Invention Thus Relates, in a First Aspect, to the Use of a Polymer P as Redox-Active Electrode Material for Electrical Charge Storage Means, where the polymer P comprises n mutually joined repeat units of the chemical structure (I)

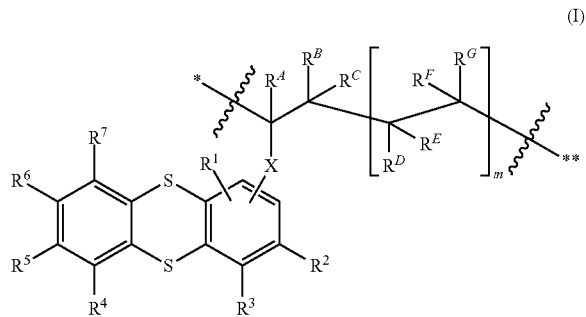

(I)

where n is an integer≥4, where m is an integer≥0, where the repeat units of the chemical structure (I) within the polymer P are the same or at least partly different from one another, where the repeat units of the chemical structure (I) within the polymer P are joined to one another in such a way that the bond identified by "*" in a particular repeat unit is joined to the bond identified by "*" in the adjacent repeat unit, where the $R^A$, $R^B$, $R^C$, $R^D$, $R^E$, $R^F$, $R^G$, $R^1$, $R^2$, $R^3$, $R^4$, $R^5$, $R^6$, $R^7$ radicals are each independently selected from the group consisting of hydrogen, $-NO_2$, $-CN$, -halogen, $-COOR^8$, $-C(=O)NHR^9$, $-NR^{10}R^{11}$, $-OR^{12}$, $-SR^{13}$, $-OP(=O)(O^-(M^{z+})_{1/z})_2$, $-OP(=O)(OR^{14})O^-(M^{z+})_{1/z}$, $-OP(=O)(OR^{15})(OR^{16})$, $-S(O)_2O^-(M^{z+})_{1/z}$, $-S(O)_2OR^{17}$, substituted or unsubstituted (hetero)aromatic radical, substituted or unsubstituted aliphatic radical, where at least one group selected from disulphide, ether, thioether, amino ether, carbonyl, carboxylic ester, sulphonic ester, phosphoric ester is optionally present within the substituted or unsubstituted aliphatic radical, where $R^8$, $R^9$, $R^{10}$, $R^{11}$, $R^{12}$, $R^{13}$, $R^{14}$, $R^{15}$, $R^{16}$, $R^{17}$ are each independently selected from hydrogen, substituted or unsubstituted (hetero)aromatic radical, substituted or unsubstituted aliphatic radical, where at least one group selected from disulphide, ether, thioether, amino ether, carbonyl, carboxylic ester, sulphonic ester, phosphoric ester is optionally present within the substituted or unsubstituted aliphatic radical, where $M^{z+}$ is selected from the group consisting of metallic cation, organic cation, preferably selected from the group consisting of alkali metal cation, alkaline earth metal cation, transition metal cation, tetraalkylammonium cation, imidazolium cation, monoalkylimidazolium cation, dialkylimidazolium cation, where z indicates the number of positive charges of $M^{z+}$, where at least two radicals in ortho positions to one another among the $R^1$, $R^2$, $R^3$ radicals and/or at least two radicals in ortho positions to one another among the $R^4$, $R^5$, $R^6$, $R^7$ radicals may each also be bridged by at least one substituted or unsubstituted (hetero)aromatic ring or by a substituted or unsubstituted aliphatic ring, where at least one group selected from disulphide, ether, thioether, amino ether, carbonyl, carboxylic ester, sulphonic ester, phosphoric ester is optionally present within the substituted or unsubstituted aliphatic ring, where X is selected from the group consisting of &-$(X^1)_{p1}$-[C=$Y^1$]$_{q1}$-$(X^2)_{p2}$-B-$(X^3)_{p3}$-[C=$Y^2$]$_{q2}$-$(X^4)_{p4}$-&&, &-$(X^5)_{p5}$-(C=$Y^3$)$_{q3}$-$(X^6)_{p6}$-&&, direct bond, where p1, q1, p2 are each 0 or 1, with the proviso that it is not simultaneously true that p1=p2=1 and q1=0, where p3, q2, p4 are each 0 or 1, with the proviso that it is not simultaneously true that p3=p4=1 and q2=0, where p5, q3, p6 are each 0 or 1, with the proviso that it is not simultaneously true that p5=p6=1 and q3=0, and that, when p5=1 and q3=0, p6=0, and that it is not true that p5=q3=p6=0, where $Y^1$, $Y^2$, $Y^3$ are each independently selected from O, S, where $X^1$, $X^2$, $X^3$, $X^4$, $X^5$, $X^6$ are each independently selected from $-O-$, $-S-$, $-NH-$, $-N$alkyl-, where B is a divalent substituted or unsubstituted (hetero) aromatic radical or a divalent substituted or unsubstituted aliphatic radical, where at least one group selected from disulphide, ether, thioether, amino ether, carbonyl, carboxylic ester, sulphonic ester, phosphoric ester is optionally present within the substituted or unsubstituted aliphatic radical, where "&" denotes the bond to the carbon atom joined to $R^A$, and where "&&" denotes the bond to the thianthrene ring.

1.2) The Present Invention Relates, in a Particular Embodiment of the First Aspect, to the Use of a Polymer P as Redox-Active Electrode Material for Electrical Charge Storage Means, where the polymer P comprises n mutually joined repeat units of the chemical structure (I)

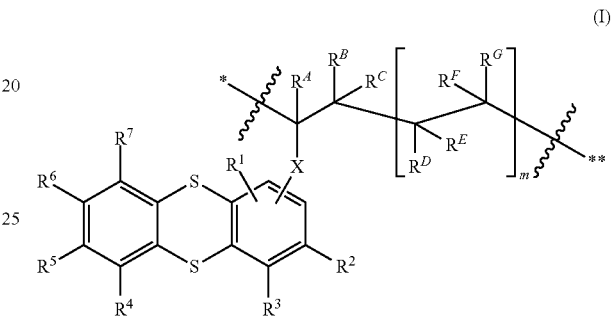

where n is an integer≥4, where m is an integer≥0, where the repeat units of the chemical structure (I) within the polymer P are the same or at least partly different from one another, where the repeat units of the chemical structure (I) within the polymer P are joined to one another in such a way that the bond identified by "*" in a particular repeat unit is joined to the bond identified by "*" in the adjacent repeat unit, where the $R^A$, $R^B$, $R^C$, $R^D$, $R^E$, $R^F$, $R^G$, $R^1$, $R^2$, $R^3$, $R^4$, $R^5$, $R^6$, $R^7$ radicals are each independently selected from the group consisting of hydrogen, $-CN$, -halogen, $-COOR^8$, $-C(=O)NHR^9$, $-NR^{10}R^{11}$, $-OR^{12}$, $-SR^{13}$, $-OP(=O)(O^-(M^{z+})_{1/z})_2$, $-OP(=O)(OR^{14})O^-(M^{z+})_{1/z}$, $-OP(=O)(OR^{15})(OR^{16})$, $-S(O)_2O^-(M^{z+})_{1/z}$, $-S(O)_2OR^{17}$, substituted or unsubstituted (hetero)aromatic radical, substituted or unsubstituted aliphatic radical, where at least one group selected from disulphide, ether, thioether, sulphonic ester is optionally present within the substituted or unsubstituted aliphatic radical, where $R^8$, $R^9$, $R^{10}$, $R^{11}$, $R^{12}$, $R^{13}$, $R^{14}$, $R^{15}$, $R^{16}$, $R^{17}$ are each independently selected from hydrogen, substituted or unsubstituted (hetero)aromatic radical, substituted or unsubstituted aliphatic radical, where at least one group selected from disulphide, ether, thioether, sulphonic ester is optionally present within the substituted or unsubstituted aliphatic radical, where $M^{z+}$ is selected from the group consisting of alkali metal cation, where the alkali metal cation is preferably selected from the group consisting of $Li^+$, $Na^+$, $K^+$, alkaline earth metal cation, where the alkaline earth metal cation is preferably selected from the group consisting of $Mg^{2+}$, $Ca^{2+}$, transition metal cation, where the transition metal cation is preferably selected from the group consisting of iron cation, zinc cation, mercury cation, nickel cation, cadmium cation, or tetraalkylammonium cation, imidazolium cation, monoalkylimidazolium cation, dialkylimidazolium cation, where the alkyl groups in the tetraalkylammonium cation, monoalkylimidazolium cation, dialkylimidazolium cation preferably each independently have 1 to 30 carbon atoms, where z indicates the number of positive charges of $M^{z+}$, where at least two radicals in Who positions to one another among the $R^1$, $R^2$, $R^3$ radicals and/or at least two radicals in ortho positions to one another among the $R^4$, $R^5$, $R^6$, $R^7$ radicals may each also be bridged by at least one substituted or unsubstituted (hetero)aromatic ring or by a substituted or unsubstituted aliphatic ring, where at least one group selected from disulphide, ether, thioether, sulphonic ester is optionally present within the substituted or unsubstituted aliphatic ring, where X is selected from the group consisting of &-$(X^1)_{p1}$-$[C=Y^1]_{q1}$-$(X^2)_{p2}$-B-$(X^3)_{p3}$-$[C=Y^2]_{q2}$-$(X^4)_{p4}$-&&, &-$(X^5)_{p5}$-$(C=Y^3)_{q3}$-$(X^6)_{p6}$-&&, direct bond, where p1, q1, p2 are each 0 or 1, with the proviso that it is not simultaneously true that p1=p2=1 and q1=0, where p3, q2, p4 are each 0 or 1, with the proviso that it is not simultaneously true that p3=p4=1 and q2=0, where p5, q3, p6 are each 0 or 1, with the proviso that it is not simultaneously true that p5=p6=1 and q3=0, and that, when p5=1 and q3=0, p6=0, and that it is not true that p5=q3=p6=0, where $Y^1$, $Y^2$, $Y^3$ are each independently selected from O, S, where $X^1$, $X^2$, $X^3$, $X^4$, $X^5$, $X^6$ are each independently selected from —O—, —S—, —NH—, —Nalkyl-, where B is a divalent substituted or unsubstituted (hetero)aromatic radical or a divalent substituted or unsubstituted aliphatic radical, where at least one group selected from disulphide, ether, thioether, sulphonic ester is optionally present within the substituted or unsubstituted aliphatic radical, where "&" denotes the bond to the carbon atom joined to $R^A$, and where "&&" denotes the bond to the thianthrene ring.

1.3) The Present Invention Relates, in a Preferred Embodiment of the First Aspect, to the Use of a Polymer P as Redox-Active Electrode Material for Electrical Charge Storage Means, where the polymer P comprises n mutually joined repeat units of the chemical structure (I)

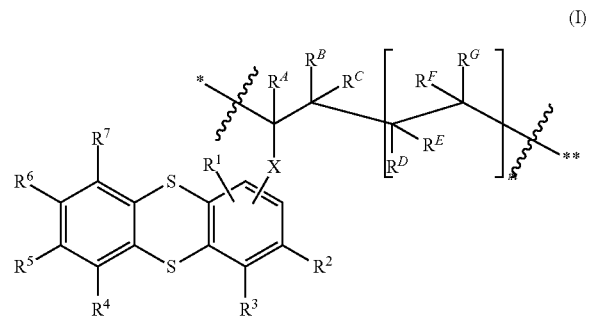

(I)

where n is an integer≥4,
where m is an integer≥0,
where the repeat units of the chemical structure (I) within the polymer P are the same or at least partly different from one another,
where the repeat units of the chemical structure (I) within the polymer P are joined to one another in such a way that the bond identified by "*" in a particular repeat unit is joined to the bond identified by "**" in the adjacent repeat unit, where the $R^A$, $R^B$, $R^C$, $R^D$, $R^E$, $R^F$, $R^G$ radicals are each independently selected from the group consisting of hydrogen, —CN, -halogen, —COOR$^8$, —C(=O)NHR$^9$, —NR$^{10}$R$^{11}$, —OR$^{12}$, —SR$^{13}$, substituted or unsubstituted phenyl radical, substituted or unsubstituted aliphatic radical, where at least one group selected from ether, thioether, sulphonic ester is optionally present within the substituted or unsubstituted aliphatic radical, where the $R^1$, $R^2$, $R^3$, $R^4$, $R^5$, $R^6$, $R^7$ radicals are each independently selected from the group consisting of hydrogen, —CN, -halogen, —COOR$^{18}$, —OR$^{22}$, —SR$^{23}$, —OP(=O)(O$^-$(M$^{z+}$)$_{1/z}$)$_2$, —OP(=O)(OR$^{24}$)O$^-$(M$^{z+}$)$_{1/z}$, —OP(=O)(OR$^{25}$)(OR$^{26}$), —S(O)$_2$O$^-$(M$^{z+}$)$_{1/z}$, —S(O)$_2$OR$^{27}$, substituted or unsubstituted (hetero)aromatic radical, substituted or unsubstituted aliphatic radical, where at least one group selected from disulphide, ether, thioether, sulphonic ester is optionally present within the substituted or unsubstituted aliphatic radical, where $R^8$, $R^9$, $R^{10}$, $R^{11}$, $R^{12}$, $R^{13}$, $R^{18}$, $R^{22}$, $R^{23}$, $R^{24}$, $R^{25}$, $R^{26}$, $R^{27}$ are each independently selected from hydrogen, substituted or unsubstituted (hetero)aromatic radical, substituted or unsubstituted aliphatic radical, where at least one group selected from disulphide, ether, thioether, sulphonic ester is optionally present within the substituted or unsubstituted aliphatic radical, where $M^{z+}$ is selected from the group consisting of Li$^+$, Na$^+$, K$^+$, Mg$^{2+}$, Ca$^{2+}$, Zn$^{2+}$, Fe$^{2+}$, Fe$^{3+}$, Cd$^{2+}$, Hg$^+$, Hg$^{2+}$, Ni$^{2+}$, Ni$^{3+}$, Ni$^{4+}$, tetraalkylammonium cation, imidazolium cation, monoalkylimidazolium cation, dialkylimidazolium cation, where the alkyl groups in the tetraalkylammonium cation, monoalkylimidazolium cation, dialkylimidazolium cation each independently have 1 to 10 carbon atoms, where z indicates the number of positive charges of $M^{z+}$, where at least two radicals in ortho positions to one another among the $R^1$, $R^2$, $R^3$ radicals and/or at least two radicals in ortho positions to one another among the $R^4$, $R^5$, $R^6$, $R^7$ radicals may each also be bridged by at least one substituted or unsubstituted (hetero)aromatic ring or by a substituted or unsubstituted aliphatic ring, where at least one group selected from disulphide, ether, thioether, sulphonic ester is optionally present within the substituted or unsubstituted aliphatic ring, where X is selected from the group consisting of &-$(X^1)_{p1}$-$[C=Y^1]_{q1}$-$(X^2)_{p2}$-B-$(X^3)_{p3}$-$[C=Y^2]_{q2}$-$(X^4)_{p4}$-&&, &-$(X^5)_{p5}$-$(C=Y^3)_{q3}$-$(X^6)_{p6}$-&&, direct bond, where p1, q1, p2 are each 0 or 1, with the proviso that it is not simultaneously true that p1=p2=1 and q1=0, where p3, q2, p4 are each 0 or 1, with the proviso that it is not simultaneously true that p3=p4=1 and q2=0, where p5, q3, p6 are each 0 or 1, with the proviso that it is not simultaneously true that p5=p6=1 and q3=0, and that, when p5=1 and q3=0, p6=0, and that it is not true that p5=q3=p6=0, where $Y^1$, $Y^2$, $Y^3$ are each independently selected from O, S, where $X^1$, $X^2$, $X^3$, $X^4$, $X^5$, $X^6$ are each independently selected from —O—, —S—, where B is a divalent substituted or unsubstituted (hetero)aromatic radical or a divalent substituted or unsubstituted aliphatic radical, where at least one group selected from ether, thioether is optionally present within the substituted or unsubstituted aliphatic radical, where "&" denotes the bond to the carbon atom joined to $R^A$, and where "&&" denotes the bond to the thianthrene ring.

1.4) The Present Invention Relates, in a More Preferred Embodiment of the First Aspect, to the Use of a Polymer P as Redox-Active Electrode Material for Electrical Charge Storage Means, where the polymer P comprises n mutually joined repeat units of the chemical structure (I)

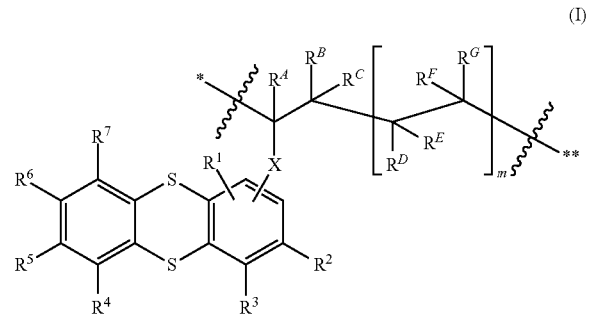

(I)

where n is an integer≥4,
where m is an integer≥0,
where the repeat units of the chemical structure (I) within the polymer P are the same or at least partly different from one another,
where the repeat units of the chemical structure (I) within the polymer P are joined to one another in such a way that the bond identified by "*" in a particular repeat unit is joined to the bond identified by "*" in the adjacent repeat unit,
where the $R^A$, $R^B$, $R^C$, $R^D$, $R^E$, $R^F$, $R^G$ radicals are each independently selected from the group consisting of hydrogen, —CN, -halogen, —COOR$^8$, —OR$^{12}$, —SR$^{13}$, substituted or unsubstituted phenyl radical, substituted or unsubstituted alkyl radical having preferably 1 to 10 carbon atoms, where at least one group selected from ether, thioether is optionally present within the substituted or unsubstituted alkyl radical,
where the $R^1$, $R^2$, $R^3$, $R^4$, $R^5$, $R^6$, $R^7$ radicals are each independently selected from the group consisting of hydrogen, -halogen, —COOR$^{18}$, —OR$^{22}$, —SR$^{23}$, —OP(=O)(O$^-$(M$^{z+}$)$_{1/z}$)$_2$, —OP(=O)(OR$^{24}$)O$^-$ (M$^{z+}$)$_{1/z}$, —OP(=O)(OR$^{25}$)(OR$^{26}$), —S(O)$_2$O$^-$(M$^{z+}$)$_{1/z}$, —S(O)$_2$OR$^{27}$, substituted or unsubstituted alkyl radical having preferably 1 to 10 carbon atoms, where at least one group selected from ether, thioether, sulphonic ester is optionally present within the substituted or unsubstituted alkyl radical,
where $R^8$, $R^{12}$, $R^{13}$, $R^{18}$, $R^{22}$, $R^{23}$, $R^{24}$, $R^{25}$, $R^{26}$, $R^{27}$ are each independently selected from hydrogen, substituted or unsubstituted (hetero)aromatic radical, substituted or unsubstituted alkyl radical having preferably 1 to 10 carbon atoms, where at least one group selected from disulphide, ether, thioether, sulphonic ester is optionally present within the substituted or unsubstituted alkyl radical,
where M$^{z+}$ is selected from the group consisting of Li$^+$, Na$^+$, K$^+$, Mg$^{2+}$, Ca$^{2+}$, Zn$^{2+}$, Fe$^{2+}$, Fe$^{3+}$, Cd$^{2+}$, Hg$^+$, Hg$^{2+}$, Ni$^{2+}$, Ni$^{3+}$, Ni$^{4+}$,
where z in the case of each of Li$^+$, Na$^+$, K$^+$, Hg$^+$=1,
where z in the case of each of Mg$^{2+}$, Ca$^{2+}$, Zn$^{2+}$, Cd$^{2+}$, Hg$^{2+}$, Ni$^{2+}$, Fe$^{2+}$=2,
where z in the case of Fe$^{3+}$, Ni$^{3+}$=3,
where z in the case of Ni$^{4+}$=4,
where X is selected from the group consisting of &-(X$^1$)$_{p1}$-[C=Y$^1$]$_{q1}$-(X$^2$)$_{p2}$-B-(X$^3$)$_{p3}$-[C=Y$^2$]$_{q2}$-(X$^4$)$_{p4}$-&&, &-(X$^5$)$_{p5}$-(C=Y$^3$)$_{q3}$-(X$^6$)$_{p6}$-&&, direct bond,
where p1, q1, p2 are each 0 or 1, with the proviso that it is not simultaneously true that p1=p2=1 and q1=0,
where p3, q2, p4 are each 0 or 1, with the proviso that it is not simultaneously true that p3=p4=1 and q2=0,
where p5, q3, p6 are each 0 or 1, with the proviso that it is not simultaneously true that p5=p6=1 and q3=0, and that, when p5=1 and q3=0, p6=0, and that it is not true that p5=q3=p6=0, where Y$^1$, Y$^2$, Y$^3$ are each independently selected from O, S,
where X$^1$, X$^2$, X$^3$, X$^4$, X$^5$, X$^6$ are each independently selected from —O—, —S—,
where B is a divalent substituted or unsubstituted (hetero)aromatic radical, preferably phenylene or tolylene, or a divalent substituted or unsubstituted alkylene or alkenylene radical having preferably 1 to 10 carbon atoms, where at least one group selected from ether, thioether is optionally present within the substituted or unsubstituted alkylene or alkenylene radical,
where "&" denotes the bond to the carbon atom joined to $R^A$,
and where "&&" denotes the bond to the thianthrene ring.

1.5) The Present Invention Relates, in an Even More Preferred Embodiment of the First Aspect, to the Use of a Polymer P as Redox-Active Electrode Material for Electrical Charge Storage Means, where the polymer P comprises n mutually joined repeat units of the chemical structure (I)

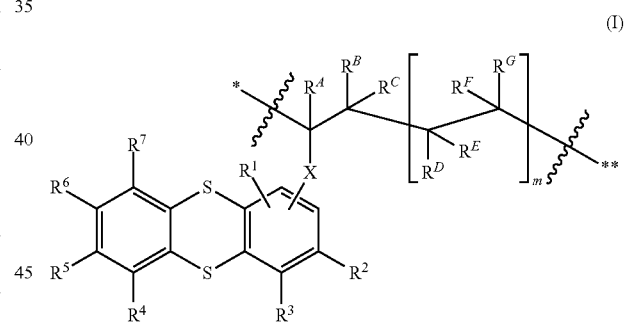

(I)

where n is an integer≥4,
where m is an integer≥0,
where the repeat units of the chemical structure (I) within the polymer P are the same or at least partly different from one another,
where the repeat units of the chemical structure (I) within the polymer P are joined to one another in such a way that the bond identified by "*" in a particular repeat unit is joined to the bond identified by "*" in the adjacent repeat unit,
where the $R^A$, $R^B$, $R^C$, $R^D$, $R^E$, $R^F$, $R^G$ radicals are each independently selected from the group consisting of hydrogen, —CN, -halogen, —COOR$^8$, substituted or unsubstituted phenyl radical, substituted or unsubstituted alkyl radical having preferably 1 to 10 carbon atoms,
where the $R^1$, $R^2$, $R^3$, $R^4$, $R^5$, $R^6$, $R^7$ radicals are each independently selected from the group consisting of hydrogen, -halogen, —COOR$^{18}$, —OR$^{22}$, —SR$^{23}$, substituted or unsubstituted alkyl radical having preferably 1 to 10 carbon atoms, where $R^8$, $R^{18}$, $R^{22}$, $R^{23}$ are each independently selected from hydrogen, substituted or unsubstituted alkyl radical having especially 1 to 10 carbon atoms, preferably substituted or unsubstituted alkyl radical having more preferably 1 to 10 carbon atoms, where X is selected from the group consisting of &-$(X^1)_{p1}$-$[C=Y^1]_{q1}$-$(X^2)_{p2}$-B-$(X^3)_{p3}$-$[C=Y^2]_{q2}$-$(X^4)_{p4}$-&&, &-$(X^5)_{p5}$-$(C=Y^3)_{q3}$-$(X^6)_{p6}$-&&, direct bond, where p1, q1, p2 are each 0 or 1, with the proviso that it is not simultaneously true that p1=p2=1 and q1=0, where p3, q2, p4 are each 0 or 1, with the proviso that it is not simultaneously true that p3=p4=1 and q2=0, where p5, q3, p6 are each 0 or 1, with the proviso that it is not simultaneously true that p5=p6=1 and q3=0, and that, when p5=1 and q3=0, p6=0, and that it is not true that p5=q3=p6=0, where $Y^1$, $Y^2$, $Y^3$ are each independently selected from O, S, where $X^1$, $X^2$, $X^3$, $X^4$, $X^5$, $X^6$ are each independently selected from —O—, —S—, where B is selected from the group consisting of phenylene, tolylene, divalent substituted or unsubstituted alkylene or alkenylene radical having preferably 1 to 10 carbon atoms, where "&" denotes the bond to the carbon atom joined to $R^A$, and where "&&" denotes the bond to the thianthrene ring.

1.6) The Present Invention Relates, in an Even More Preferred Embodiment of the First Aspect Still, to the Use of a Polymer P as Redox-Active Electrode Material for Electrical Charge Storage Means, where the polymer P comprises n mutually joined repeat units of the chemical structure (I)

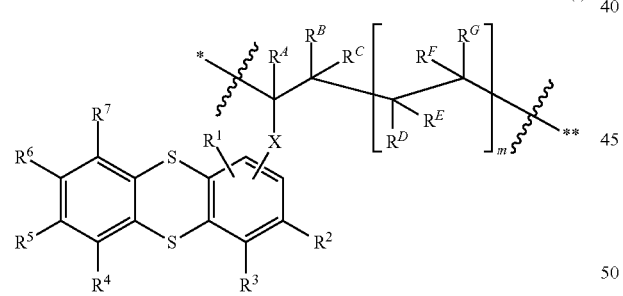

(I)

where n is an integer≥4, where m is an integer≥0, where the repeat units of the chemical structure (I) within the polymer P are the same or at least partly different from one another, where the repeat units of the chemical structure (I) within the polymer P are joined to one another in such a way that the bond identified by "*" in a particular repeat unit is joined to the bond identified by "**" in the adjacent repeat unit, where the $R^A$, $R^B$, $R^C$, $R^D$, $R^E$, $R^F$, $R^G$ radicals are each independently selected from the group consisting of hydrogen, —CN, -halogen, —COOR$^8$, phenyl radical unsubstituted or substituted by a group selected from alkyl, alkenyl, alkynyl, and of substituted or unsubstituted alkyl radical having preferably 1 to 10 carbon atoms, where the $R^1$, $R^2$, $R^3$, $R^4$, $R^5$, $R^6$, $R^7$ radicals are each independently selected from the group consisting of hydrogen, -halogen, —COOR$^{18}$, —OR$^{22}$, —SR$^{23}$, substituted or unsubstituted alkyl radical having preferably 1 to 10 carbon atoms, where $R^8$, $R^{18}$, $R^{22}$, $R^{23}$ are each independently selected from hydrogen, substituted or unsubstituted alkyl radical having especially 1 to 10 carbon atoms, preferably substituted or unsubstituted alkyl radical having more preferably 1 to 10 carbon atoms, where X is selected from the group consisting of &-$(X^1)_{p1}$-$[C=Y^1]_{q1}$-$(X^2)_{p2}$-B-$(X^3)_{p3}$-$[C=Y^2]_{q2}$-$(X^4)_{p4}$-&&, &-$(X^5)_{p5}$-$(C=Y^3)_{q3}$-$(X^6)_{p6}$-&&, direct bond, where p1, q1, p2 are each 0 or 1, with the proviso that it is not simultaneously true that p1=p2=1 and q1=0, where p3, q2, p4 are each 0 or 1, with the proviso that it is not simultaneously true that p3=p4=1 and q2=0, where p5, q3, p6 are each 0 or 1, with the proviso that it is not simultaneously true that p5=p6=1 and q3=0, and that, when p5=1 and q3=0, p6=0, and that it is not true that p5=q3=p6=0, where $Y^1$, $Y^2$, $Y^3$ are each independently selected from O, S, where $X^1$, $X^2$, $X^3$, $X^4$, $X^5$, $X^6$ are each independently selected from —O—, —S—, where B is selected from the group consisting of phenylene, tolylene, divalent substituted or unsubstituted alkylene or alkenylene radical having preferably 1 to 10 carbon atoms, where "&" denotes the bond to the carbon atom joined to $R^A$, and where "&&" denotes the bond to the thianthrene ring.

1.7) The Present Invention Relates, in an Even Further Preferred Embodiment of the First Aspect, to the Use of a Polymer P as Redox-Active Electrode Material for Electrical Charge Storage Means, where the polymer P comprises n mutually joined repeat units of the chemical structure (I)

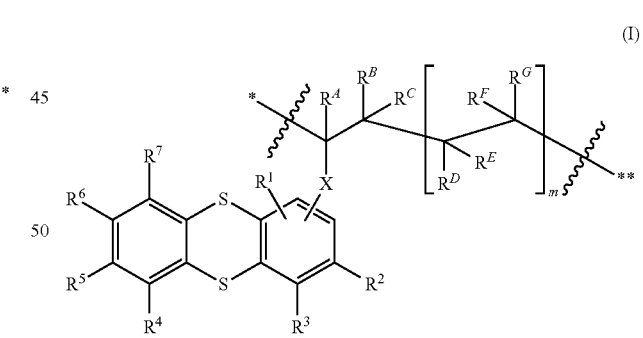

(I)

where n is an integer≥4, where m is an integer≥0, where the repeat units of the chemical structure (I) within the polymer P are the same or at least partly different from one another, where the repeat units of the chemical structure (I) within the polymer P are joined to one another in such a way that the bond identified by "*" in a particular repeat unit is joined to the bond identified by "*" in the adjacent repeat unit, where the $R^A$, $R^B$, $R^C$, $R^E$, $R^F$ radicals are each independently selected from the group consisting of hydrogen, -halogen, alkyl group having preferably 1 to 6 carbon atoms, where the $R^D$, $R^G$ radicals are independently selected from the group consisting of hydrogen, -halogen, alkyl radical having preferably 1 to 6 carbon atoms, —COOR$^8$, phenyl radical unsubstituted or substituted by a group selected from alkyl, preferably having 1 to 10 carbon atoms, alkenyl, preferably having 2 to 10 carbon atoms, and of —CN, where the $R^1$, $R^2$, $R^3$, $R^4$, $R^5$, $R^6$, $R^7$ radicals are each independently selected from the group consisting of hydrogen, -halogen, —COOR$^{18}$, —OR$^{22}$, —SR$^{23}$, alkyl radical having preferably 1 to 6 carbon atoms, where $R^8$, $R^{18}$, $R^{22}$, $R^{23}$ are each independently selected from hydrogen, alkyl radical having preferably 1 to 6 carbon atoms, preferably alkyl radical having more preferably 1 to 6 carbon atoms, where X is selected from the group consisting of &-(X$^1$)$_{p1}$-[C=Y$^1$]$_{q1}$-(X$^2$)$_{p2}$-B-(X$^3$)$_{p3}$-[C=Y$^2$]$_{q2}$-(X$^4$)$_{p4}$-&&, direct bond, where p1, q1, p2 are each 0 or 1, with the proviso that it is not simultaneously true that p1=p2=1 and q1=0, where p3, q2, p4 are each 0 or 1, with the proviso that it is not simultaneously true that p3=p4=1 and q2=0, where $Y^1$, $Y^2$ are each independently selected from O, S, where $X^1$, $X^2$, $X^3$, $X^4$ are each independently selected from —O—, —S—, where B is selected from the group consisting of phenylene, tolylene, alkylene radical having 1 to 6 carbon atoms, alkenylene radical having preferably 1 to 6 carbon atoms, where "&" V denotes the bond to the carbon atom joined to $R^A$, and where "&&" denotes the bond to the thianthrene ring.

1.8) The Present Invention Relates, in the Most Preferred Embodiment of the First Aspect, to the Use of a Polymer P as Redox-Active Electrode Material for Electrical Charge Storage Means, where the polymer P comprises n mutually joined repeat units of the chemical structure (I)

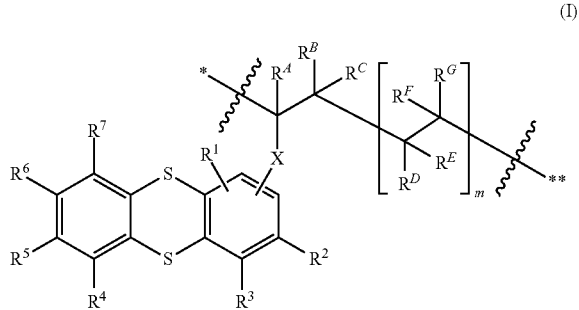

(I)

where n is an integer≥4,
where m is an integer≥0,
where the repeat units of the chemical structure (I) within the polymer P are the same or at least partly different from one another,
where the repeat units of the chemical structure (I) within the polymer P are joined to one another in such a way that the bond identified by "*" in a particular repeat unit is joined to the bond identified by "**" in the adjacent repeat unit,
where the $R^A$, $R^B$, $R^C$, $R^E$, $R^F$ radicals are each independently selected from the group consisting of hydrogen, —F, —Cl; preferably, $R^A$=$R^B$=$R^C$=$R^E$=$R^F$=hydrogen, where the $R^D$, $R^G$ radicals are each independently selected from the group consisting of hydrogen, —F, —Cl, phenyl radical, phenyl radical substituted by at least one, preferably exactly one, vinyl group; preferably, the $R^D$, $R^G$ radicals are each independently selected from the group consisting of hydrogen, —F, —Cl, phenyl radical; even more preferably, $R^D$=$R^G$=hydrogen, where the $R^1$, $R^2$, $R^3$, $R^4$, $R^5$, $R^6$, $R^7$ radicals are each independently selected from the group consisting of hydrogen, —F, —Cl, —OR$^{22}$, —SR$^{23}$, alkyl radical having 1 to 6 carbon atoms; preferably, $R^1$=$R^2$=$R^3$=$R^4$=$R^5$=$R^6$=$R^7$=hydrogen, where the $R^{22}$, $R^{23}$ radicals are each independently selected from alkyl radical having 1 to 6 carbon atoms, where X is selected from the group consisting of direct bond, &-O—CH=CH-&&, &-CH=CH—O-&&, &-O—CH$_2$—CH=CH-&&, &-CH=CH—CH$_2$—O-&&, phenylene, &-CH$_2$-phenylene-&&, &-phenylene-CH$_2$-&&, alkylene having 1 to 6 carbon atoms; preferably, X=direct bond, where "&" denotes the bond to the carbon atom joined to $R^A$, and where "&&" denotes the bond to the thianthrene ring.

Even more preferably, in the aforementioned embodiments of the first aspect of the invention, $R^1$ is in the meta position to $R^2$ and the bond joined to X is in the ortho position to $R^2$.

The polymers according to the invention, in the first aspect of the present invention, by contrast with those described by Speer et al, have a backbone derived from polyethylene. It has been found that, surprisingly, the polymers according to the invention are suitable for use in batteries, which leads to a higher capacity of the corresponding battery, even after going through further charging/discharging cycles (also referred to as "cycling stability").

The polymer P according to the invention, in the first aspect of the present invention, comprises n mutually joined repeat units of the chemical structure (I).

In this context, n is an integer≥4, especially an integer≥4 and ≤5000, preferably an integer≥10 and ≤1000, even more preferably ≥20 and ≤1000, even more preferably ≥50 and ≤1000, even more preferably still ≥100 and ≤1000.

In this context, m is an integer≥0, especially an integer≥0 and ≤5000, preferably an integer≥0 and ≤1000; especially preferably, m=0.

In this context, the average molar mass of the polymer P in the first aspect of the present invention (determined by means of size exclusion chromatography with a polystyrene standard: DIN 55672-2:2015-02) is especially 700 to 2,000,000 g/mol, preferably 1000 to 1,000,000 g/mol, more preferably 3000 to 300,000 g/mol, even more preferably 35,500 g/mol.

In the first aspect of the present invention, the repeat units of the chemical structure (I) within the polymer are the same or at least partly different from one another.

"At least partly different from one another" in the context of the present invention means that at least two repeat units of the chemical structure (I) in the polymer P differ from one another; more particularly, this means that at least two of the n mutually joined repeat units of the chemical structure (I) differ in at least one of the $R^A$, $R^B$, $R^C$, $R^D$, $R^E$, $R^F$, $R^G$, $R^1$, $R^2$, $R^3$, $R^4$, $R^5$, $R^6$, $R^7$, X radicals and/or in the position of $R^1$ on the thianthrene ring and/or in the value of m.

At the same time, the repeat units of the chemical structure (I) within the polymer are joined to one another in such a way that the bond identified by "*" in a particular repeat unit is joined to the bond identified by "**" in the adjacent repeat unit.

In this invention, in the chemical structure (I), the $R^1$ radical and the X radical are joined to the thianthrene radical via one bond each, the respective bond being shown as projecting into the thianthrene radical. This means that the following two options for the chemical structure (I) are encompassed:
  (i) $R^1$ in the chemical structure (I) is in the meta position to $R^2$ and the bond joined to X is in the ortho position to $R^2$.
  (i) $R^1$ in the chemical structure (I) is in the ortho position to $R^2$ and the bond joined to X is in the meta position to $R^2$.

Option (i) is the more preferred option here.

The end groups of the first repeat unit of the polymer according to the invention which is present for these in the chemical structure (I) at the bond defined by "*", and the end groups of the nth repeat unit of the polymer according to the invention which is present for these in the chemical structure (I) at the bond defined by "**", are not particularly restricted and, more particularly, are a result of the polymerization method used in the method for preparing the polymer used in accordance with the invention. Thus, they may be termination fragments of an initiator or a repeat unit. Preferably, these end groups are selected from hydrogen, halogen, hydroxyl, unsubstituted aliphatic radical or aliphatic radical substituted by —CN, —OH, halogen (which may especially be an unsubstituted or correspondingly substituted alkyl group), (hetero)aromatic radical, which is preferably a phenyl radical, benzyl radical or a-hydroxybenzyl.

In the case of X, "&&" denotes the bond from X to the thianthrene ring, and "&" the bond that joins X to $R^4$.

"-Halogen" in the context of the invention denotes —F, —Cl, —Br, —I, preferably —F, —Cl.

"Monoalkylimidazolium cation" especially denotes 1-monoalkylimidazolium cation, i.e. an imidazolium cation bearing an alkyl group on one of the nitrogen atoms of the imidazolium ring.

"Dialkylimidazolium cation" especially denotes 1,3-dialkylimidazolium cation, i.e. an imidazolium cation bearing one alkyl group on each of the two nitrogen atoms of the imidazolium ring.

An aliphatic radical in the context of the invention is an acyclic or cyclic, saturated or unsaturated, unbranched or branched hydrocarbyl group which is nonaromatic.

An aliphatic radical may be monovalent or divalent. If it is monovalent, this means that it is joined to the rest of the molecule only via one of its carbon atoms. A monovalent hydrocarbyl radical is especially a hydrocarbyl group selected from alkyl group, alkenyl group, alkynyl group and saturated or unsaturated cycloalkyl group. In the presence of a double bond an unsaturated cycloalkyl group is called "cycloalkenyl group", and in the presence of a triple bond a "cycloalkynyl group".

A divalent aliphatic radical is joined to the rest of the molecule via two bonds proceeding from the same or two different carbon atoms. A divalent hydrocarbyl radical is especially a hydrocarbyl group selected from alkylene group, alkenylene group, alkynylene group, and saturated or unsaturated cycloalkylene group. In the presence of a double bond an unsaturated cycloalkylene group is called "cycloalkenylene group", and in the presence of a triple bond a "cycloalkynylene group".

When they are not referred to explicitly as divalent in this invention, the term "aliphatic radical" in the context of this invention shall be understood to mean monovalent aliphatic radicals.

In the context of the invention, an "alkyl group" is unbranched or branched and is a monovalent saturated hydrocarbyl radical having the general chemical structure (a)

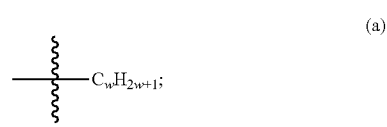

The chain of carbon atoms "—$C_wH_{2w+1}$" may be linear, in which case the group is an unbranched alkyl group. Alternatively, it may have branches, in which case it is a branched alkyl group.

In this case, w in the chemical structure (a) is an integer, especially from the range of 1 to 30, preferably from the range of 1 to 18, more preferably from the range of 1 to 12, even more preferably from the range of 1 to 10, even more preferably still from the range of 1 to 8, most preferably from the range of 1 to 6. w in an unbranched or branched alkyl group having 1 to 30 carbon atoms is selected from the range of 1 to 30. w in an unbranched or branched alkyl group having 1 to 18 carbon atoms is selected from the range of 1 to 18. w in an unbranched or branched alkyl group having 1 to 12 carbon atoms is selected from the range of 1 to 12. w in an unbranched or branched alkyl group having 1 to 10 carbon atoms is selected from the range of 1 to 10. w in an unbranched or branched alkyl group having 1 to 8 carbon atoms is selected from the range of 1 to 8. w in an unbranched or branched alkyl group having 1 to 6 carbon atoms is selected from the range of 1 to 6.

In the context of the invention, an "unbranched or branched alkyl group having 1 to 30 carbon atoms" is especially selected from methyl, ethyl, n-propyl, iso-propyl, n-butyl, sec-butyl, iso-butyl, tert-butyl, n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-heneicosyl, n-docosyl, n-tricosyl, n-tetracosyl, n-pentacosyl, n-hexacosyl, n-heptacosyl, n-octacosyl, n-nonacosyl, n-triacontyl.

In the context of the invention, an "unbranched or branched alkyl group having 1 to 18 carbon atoms" is especially selected from the group consisting of methyl, ethyl, n-propyl, iso-propyl, n-butyl, sec-butyl, iso-butyl, test-butyl, n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl.

In the context of the invention, an "unbranched or branched alkyl group having 1 to 12 carbon atoms" is especially selected from the group consisting of methyl, ethyl, n-propyl, iso-propyl, n-butyl, sec-butyl, iso-butyl, tert-butyl, n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, n-nonyl, n-decyl, n-undecyl, n-dodecyl.

In the context of the invention, an "unbranched or branched alkyl group having 1 to 10 carbon atoms" is especially selected from the group consisting of methyl, ethyl, n-propyl, iso-propyl, n-butyl, sec-butyl, iso-butyl, test-butyl, n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, n-nonyl, n-decyl.

In the context of the invention, an "unbranched or branched alkyl group having 1 to 8 carbon atoms" is especially selected from the group consisting of methyl, ethyl, n-propyl, iso-propyl, n-butyl, sec-butyl, iso-butyl, test-butyl, n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl.

In the context of the invention, an "unbranched or branched alkyl group having 1 to 6 carbon atoms" is especially selected from the group consisting of methyl, ethyl, n-propyl, iso-propyl, n-butyl, sec-butyl, iso-butyl, test-butyl, n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl.

According to the invention, an alkyl group having 1 to 30 carbon atoms is especially an alkyl group having 1 to 18, preferably 1 to 12, more preferably 1 to 10, even more preferably 1 to 8 and most preferably 1 to 6 carbon atoms.

According to the invention, an alkyl group having 1 to 6 carbon atoms is especially an alkyl group having 1 to 4 carbon atoms and even more preferably selected from methyl, ethyl, n-propyl, iso-propyl, n-butyl, sec-butyl, tert-butyl.

In the context of the invention, an "alkenyl group" is unbranched or branched and is obtained from an alkyl group by replacement of at least one CH—CH single bond in the alkyl group by a C═C double bond. According to the invention, an alkenyl group especially has 2 to 10 carbon atoms, preferably 2 to 6, more preferably 2 to 4, even more preferably 2 (in which case it is vinyl) or 3 (in which case it is preferably allyl), and is most preferably vinyl.

In the context of the invention, an "alkynyl group" is unbranched or branched and is obtained from an alkyl group by replacement of at least one $CH_2$—$CH_2$ single bond in the alkyl group by a C≡C triple bond or from an alkenyl group by replacement of at least one CH═CH double bond in the alkenyl group by a C≡C triple bond. According to the invention, an alkynyl group especially has 2 to 10 carbon atoms, preferably 2 to 6, more preferably 2 to 4, even more preferably 2 (in which case it is ethynyl) or 3, and is most preferably ethynyl.

A saturated cycloalkyl group is an alkyl radical in which at least 3 carbon atoms are present within a saturated ring, and may additionally also comprise further carbon atoms not present in the ring. It may be joined to the rest of the molecule via one of these ring carbon atoms or via carbon atoms that are not within the ring. In the context of the invention, a cycloalkyl group is especially selected from cyclopropyl, cyclobutyl, cyclopropylmethyl, cyclopentyl, cyclobutylmethyl, cyclohexyl, cycloheptyl, cyclooctyl, cyclononyl, cyclodecyl, cycloundecyl, cyclododecyl, cyclotridecyl, cyclotetradecyl, cyclopentadecyl.

An unsaturated cycloalkyl group is obtained from a saturated cycloalkyl group by replacement of at least one CH—CH single bond in the saturated cycloalkyl group by at least one C═C double bond (to give the cycloalkenyl group) and/or of a $CH_2$—$CH_2$ single bond with a C≡C triple bond (to give the cycloalkynyl group).

An alkylene group in the context of the invention especially has 1 to 30, preferably 1 to 12 and more preferably 1 to 6 carbon atoms and may be branched or unbranched in the context of the invention. "Alkylene group" in the context of the invention denotes a divalent saturated hydrocarbyl radical which can be described by the general chemical structure (b)

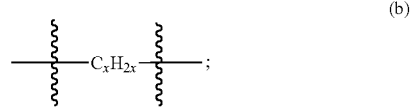

The chain of carbon atoms "—$C_xH_{2x}$—" may be linear, in which case the group is an unbranched alkylene group. Alternatively, it may have branches, in which case it is a branched alkylene group. x in the chemical structure (b) is an integer.

x in an unbranched or branched alkylene group having 1 to 30 carbon atoms is selected from the range of 1 to 30.

x in an unbranched or branched alkylene group having 1 to 12 carbon atoms is selected from the range of 1 to 12.

x in an unbranched or branched alkylene group having 1 to 6 carbon atoms is selected from the range of 1 to 6.

According to the invention, an alkylene group especially has 1 to 6 carbon atoms and preferably 1 to 4 carbon atoms and is more preferably selected from methylene, ethylene, n-propylene, n-butylene.

In the context of the invention, an "alkenylene group" is unbranched or branched and is obtained from an alkylene group by replacement of at least one CH—CH single bond in the alkylene group by a C═C double bond.

In the context of the invention, an "alkynylene group" is unbranched or branched and is obtained from an alkyl group by replacement of at least one CH$_2$—CH$_2$ single bond in the alkylene group by a C≡C triple bond or from an alkenylene group by replacement of at least one CH═CH double bond in the alkenylene group by a C≡C triple bond.

In the context of the invention, a saturated cycloalkylene group is a divalent saturated hydrocarbyl group having at least 3 and especially 3 to 30 carbon atoms and having at least one saturated ring composed of 3 to 30 carbon atoms, preferably a chemical structure (c) with

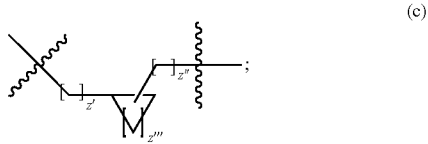

(c)

where z' is especially an integer from 0 to 27; where z" is especially an integer from 0 to 27; where z''' is especially an integer from 1 to 28; and where, at the same time, z'+z"+z'''≤28.

In the context of the invention, an unsaturated cycloalkylene group is obtained from a saturated cycloalkylene group by replacement of at least one CH—CH single bond in the cycloalkylene group by a C═C double bond (to give the cycloalkenylene group) and/or by replacement of at least one CH$_2$—CH$_2$ single bond in the cycloalkylene group by a C≡C triple bond (to give the cycloalkynylene group).

"Substituted aliphatic radical" in the context of the invention especially means that, in the aliphatic radical in question, a hydrogen atom bonded to a carbon atom in the group in question is replaced by a group selected from aromatic, heteroaromatic, —NO$_2$, —CN, —F, —Cl, —Br, —I, —C(═O)NR$^I$R$^{II}$, —NR$^{III}$R$^{IV}$, —C(═O)OR$^V$, preferably —NO$_2$, —CN, —F, —Cl, —Br, —I, even more preferably —F, —Cl, —Br, —I, where R$^I$, R$^{II}$, R$^{III}$, R$^{IV}$, R$^V$ are selected from H, alkyl, haloalkyl, aromatic, heteroaromatic.

A (hetero)aromatic radical in the context of the invention is a heteroaromatic or aromatic radical. A (hetero)aromatic radical may be monovalent, i.e. may be bonded to the rest of the molecule via just one of its carbon atoms (in the case of an aromatic radical) or via one of its carbon atoms or heteroatoms (in the case of a heteroaromatic radical).

A (hetero)aromatic radical may alternatively be divalent, i.e. may be bonded to the rest of the molecule via two of its carbon atoms (in the case of an aromatic radical) or may be bonded to the rest of the molecule via two of its carbon atoms, two of its heteroatoms or one of its carbon atoms and one of its heteroatoms (in the case of a heteroaromatic radical).

When they are not referred to explicitly as divalent in this invention, the term "(hetero)aromatic radical" in the context of this invention shall be understood to mean monovalent (hetero)aromatic radicals.

An aromatic radical has exclusively carbon atoms and at least one aromatic ring. An aromatic radical is especially selected from aryl radical, aralkyl radical, alkaryl radical. Aryl radicals have exclusively aromatic rings and are joined to the molecule via a carbon atom in the aromatic ring. An aryl radical is preferably phenyl.

Alkaryl radicals have at least one aromatic ring via which they are joined to the rest of the molecule and additionally also bear alkyl radicals on the aromatic ring. An alkaryl radical is preferably tolyl. Aralkyl radicals are formally derived by replacement of a hydrocarbyl radical of an alkyl group with an aryl group or an alkaryl group. An alkaryl radical is preferably benzyl, phenylethyl, α-methylbenzyl.

A heteroaromatic radical is especially selected from heteroaryl radical, heteroaralkyl radical, alkylheteroaryl radical. It is an aromatic radical which additionally has at least one heteroatom, especially a heteroatom selected from the group consisting of nitrogen, oxygen, sulphur, within the aromatic ring or, in the case of a heteroaralkyl radical or of an alkylheteroaryl radical, alternatively or additionally outside the aromatic ring.

Preferred (hetero)aromatic radicals are selected from the group consisting of a ring of the above identified chemical structure (III), azole, imidazole, pyrrole, pyrazole, triazole, tetrazole, thiophene, furan, thiazole, thiadiazole, oxazole, oxadiazole, pyridine, pyrimidine, triazine, tetrazine, thiazine, benzofuran, purine, indole, 9-anthryl, 9-phenanthryl.

A divalent (hetero)aromatic radical in the context of the invention is a divalent aromatic radical or a divalent heteroaromatic radical, preferably a divalent aromatic radical.

According to the invention, a divalent aromatic radical is a divalent hydrocarbyl group having at least 6 and preferably 6 to 30 carbon atoms, of which at least 6 carbon atoms are present in an aromatic system and the other carbon atoms, if present, are saturated. The divalent aromatic radical may be joined to the rest of the molecule via carbon atoms in the aromatic system or, if present, saturated carbon atoms.

Preferably, a divalent aromatic radical is a chemical structure (d) with

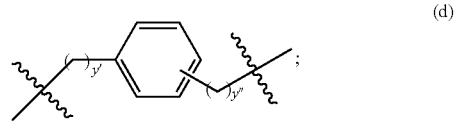

(d)

where y' is an integer >0, preferably from 0 to 24; where y" is an integer >0, preferably from 0 to 24; and where preferably, at the same time, y'+y"≤24.

A divalent heteroaromatic radical is a divalent aromatic radical which additionally has at least one heteroatom, especially at least one heteroatom selected from the group consisting of nitrogen, oxygen, sulphur, within or outside the aromatic ring, preferably within the aromatic ring, but is especially joined to the rest of the molecule via carbon atoms.

"Substituted or unsubstituted (hetero)aromatic radical" especially denotes unsubstituted (hetero)aromatic radical and preferably unsubstituted aromatic radical.

"Substituted (hetero)aromatic radical" in the context of the invention especially means that, in the (hetero)aromatic radical in question, a hydrogen atom bonded to a carbon atom in the group in question is replaced by a group selected from alkyl group, alkenyl group, alkynyl group, haloalkyl group, —NO$_2$, —CN, —F, —Cl, —Br, —I, —C(═O)NR$^I$R$^{II}$, —NR$^{III}$R$^V$, preferably —NO$_2$, —CN, —F, —Cl, alkyl group having 1 to 10 carbon atoms, alkenyl group having 2 to 10 carbon atoms, where R$^I$, R$^{II}$, R$^{III}$R$^V$ are selected from H, alkyl group having preferably 1 to 10 carbon atoms, alkenyl group having 2 to 10 carbon atoms, haloalkyl group having preferably 1 to 10 carbon atoms, aromatic, heteroaromatic.

"Where at least one group selected from disulphide, ether, thioether, amino ether, carbonyl, carboxylic ester, sulphonic ester, phosphoric ester is optionally present within the substituted or unsubstituted aliphatic radical (or ring)" means:

In the case of disulphide, that an —S—S— group is present in the aliphatic radical (or ring) at least between two $sp^3$-hybridized carbon atoms of the aliphatic radical, preferably between two —$CH_2$— groups of the aliphatic radical, even more preferably between two —$CH_2CH_2$— groups of the aliphatic radical.

In the case of ether, that an —O— group is present in the aliphatic radical (or ring) at least between two $sp^3$-hybridized carbon atoms of the aliphatic radical, preferably between two —$CH_2$— groups of the aliphatic radical, even more preferably between two —$CH_2CH_2$— groups of the aliphatic radical.

In the case of thioether, that an —S— group is present in the aliphatic radical (or ring) at least between two $sp^3$-hybridized carbon atoms of the aliphatic radical, preferably between two —$CH_2$— groups of the aliphatic radical, even more preferably between two —$CH_2CH_2$— groups of the aliphatic radical.

In the case of amino ether, that an —NR'— group with R'=H or alkyl having 1 to 10 carbon atoms is present in the aliphatic radical (or ring) at least between two $sp^3$-hybridized carbon atoms of the aliphatic radical, preferably between two —$CH_2$— groups of the aliphatic radical, even more preferably between two —$CH_2CH_2$— groups of the aliphatic radical.

In the case of carbonyl, that a —C(=O)— group is present in the aliphatic radical (or ring) at least between two $sp^3$-hybridized carbon atoms of the aliphatic radical, preferably between two —$CH_2$— groups of the aliphatic radical, even more preferably between two —$CH_2CH_2$— groups of the aliphatic radical.

In the case of carboxylic ester, that a —C(=O)—O— group is present in the aliphatic radical (or ring) at least between two $sp^3$-hybridized carbon atoms of the aliphatic radical, preferably between two —$CH_2$— groups of the aliphatic radical, even more preferably between two —$CH_2CH_2$— groups of the aliphatic radical.

In the case of sulphonic ester, that an —$S(O)_2O$— group is present in the aliphatic radical (or ring) at least between two $sp^3$-hybridized carbon atoms of the aliphatic radical, preferably between two —$CH_2$— groups of the aliphatic radical, even more preferably between two —$CH_2CH_2$— groups of the aliphatic radical.

In the case of phosphoric ester, that a group selected from —OP(=O)(O$^-$($W^{d+}$)$_{1/z}$)—O—, —OP(=O)(OR")—O— is present in the aliphatic radical (or ring) at least between two $sp^3$-hybridized carbon atoms of the aliphatic radical, preferably between two —$CH_2$— groups of the aliphatic radical, even more preferably between two —$CH_2CH_2$— groups of the aliphatic radical.

In this case, $W^{d+}$ is selected from the group consisting of alkali metal cation, where the alkali metal cation is preferably selected from the group consisting of Li$^+$, Na$^+$, K$^+$, alkaline earth metal cation, where the alkaline earth metal cation is preferably selected from the group consisting of Mg$^{2+}$, Ca$^{2+}$, transition metal cation, where the transition metal cation is preferably selected from the group consisting of iron cation, zinc cation, mercury cation, nickel cation, cadmium cation, and from tetraalkylammonium cation, imidazolium cation, monoalkylimidazolium cation, dialkylimidazolium cation, where the alkyl groups in the tetraalkylammonium cation, monoalkylimidazolium cation, dialkylimidazolium cation each independently preferably have 1 to 30 carbon atoms. Moreover, d indicates the number of positive charges of $W^{d+}$.

Preferably, $W^{d+}$ is selected from the group consisting of Li$^+$, Na$^+$, K$^+$, Mg$^{2+}$, Ca$^{2+}$, Zn$^{2+}$, Fe$^{2+}$, F$^{3+}$, Cd$^{2+}$, Hg$^+$, Hg$^{2+}$, Ni$^{2+}$, Ni$^{3+}$, Ni$^{4+}$, where d in the case of each of Li$^+$, Na$^+$, K$^+$, Hg$^+$=1, where d in the case of each of Mg$^{2+}$, Ca$^{2+}$, Zn$^{2+}$, Cd$^{2+}$, Hg$^{2+}$, Ni$^{2+}$, Fe$^{2+}$=2, where d in the case of Fe$^{3+}$, Ni$^{3+}$=3, where d in the case of Ni$^{4+}$=4.

The polymers according to the invention can be prepared by prior art methods familiar to those skilled in the art. Depending on the type of polymerization used, some of the monomers can be prepared from starting materials available commercially at very low cost in just one synthesis stage without chromatographic separation methods, which offers a distinct advance over preparation methods known in the technical literature. No further monomer is needed for the polymerization, and the polymerization does not require any costly metal catalysts; instead, it is possible to use simple polymerization processes as the production method. At the same time, it is possible to obtain polymers having a high molar mass in very high yields. The introduction of polymerizable groups of low molar mass makes it possible to keep the molar mass of the monomer low and to maximize the theoretical capacity (which is inversely proportional to the molar mass) of the secondary electrical charge storage means. In addition, the redox-active groups in these polymers are not conjugated to one another; as a consequence, the electrical charge storage means has a flat charging/discharging plateau. Furthermore, the high redox potential of the polymers according to the invention enables higher cell voltages and specific energies than in the known systems and allows higher discharge voltages and higher cycling stability.

The polymers according to this invention may either be homopolymers or copolymers. Homopolymers are polymers that have been synthesized only from one monomer, namely preferably the monomer (I)' shown below. Copolymers are polymers that have been synthesized from two or more monomers, at least one of which preferably has the structure (I)' shown below. Further monomers ("comonomers") used may be those which have one polymerizable group, such as the monomer of the structure (II)' shown below, or else two or more polymerizable groups, for example divinylbenzenes, divinylthianthrenes, which then leads to a further-crosslinked polymer within which the repeat units according to the invention are present. The degree of crosslinking of the polymers that are then obtained can be controlled by methods known to those skilled in the art via the amount of comonomer added or else via a time delay (for instance in that the comonomer is not added until the polymerization is at an advanced stage). If two or more monomers are used in the synthesis, the monomers of the repeat units of the polymers, according to this invention, may be present in the polymer in random distribution, as blocks or in alternation.

The polymer P according to the invention can thus be synthesized, for example, by anionic, cationic or free-radical polymerization, as known to those skilled in the art, of a compound of the structure (I)' below and optionally also with a structure (II)'. In the structures (I)' and (II)', the $R^A$, $R^B$, $R^C$, $R^D$, $R^E$, $R^F$, $R^G$, $R^1$, $R^2$, $R^3$, $R^4$, $R^5$, $R^6$, $R^7$, X radicals each have the definitions given above.

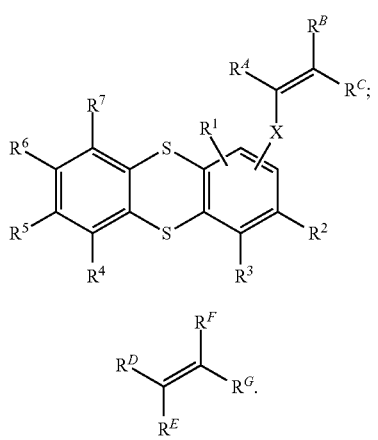

A polymer of the structure (I) can be obtained here by an anionic, cationic or free-radical polymerization in which exclusively monomers of the structure (I)' are used, such that the polymer of the structure (I) obtained is a homopolymer in which m=0.

A polymer of the structure (I) can be obtained here by an anionic, cationic or free-radical polymerization in which monomers of the structure (I)' and (II)' are used, such that the polymer of the structure (I) obtained is a copolymer in which m>0.

A further process for synthesizing the polymer P is described, for example, by H. Hopff, H. Gutenberg, *Makromolekul. Chem.* 1963, 60, 129-138.

In the first aspect, the polymer P is used as redox-active electrode material for electrical charge storage means, preferably for storage of electrical energy, and more preferably as a positive electrode element.

More preferably, the redox-active electrode material takes the form of an at least partial surface coating of electrode elements for electrical charge storage means, especially secondary batteries. Electrode elements here comprise at least one surface layer and one substrate.

A redox-active electrode material for storage of electrical energy is a material which can store electrical charge and release it again, for example by accepting and releasing electrons. This material can be used, for example, as an active electrode material in an electrical charge storage means. Such electrical charge storage means for storage of electrical energy are especially selected from the group consisting of secondary batteries (also called "accumulators"), redox flow batteries, supercapacitors, and preferably secondary batteries.

Preferably, the electrical charge storage means is a secondary battery. A secondary battery comprises a negative electrode and a positive electrode which are separated from one another by a separator, and an electrolyte which surrounds the electrodes and the separator.

The separator is a porous layer which is ion-permeable and enables the balancing of the charge. The task of the separator is to separate the positive electrode from the negative electrode and to enable balancing of charge through permutation of ions. The separator used in the secondary battery is especially a porous material, preferably a membrane consisting of a polymeric compound, for example polyolefin, polyamide or polyester. In addition, it is possible to use separators made from porous ceramic materials.

The main task of the electrolyte is to assure ion conductivity, which is needed to balance the charge. The electrolyte of the secondary battery may be either a liquid or an oligomeric or polymeric compound having high ion conductivity ("gel electrolyte" or "solid state electrolyte"). Preference is given, however, to an oligomeric or polymeric compound.

If the electrolyte is liquid, it is especially composed of one or more solvents and one or more conductive salts.

The solvent of the electrolytes preferably independently comprises one or more solvents having a high boiling point and high ion conductivity but low viscosity, for example acetonitrile, dimethyl sulphoxide, ethylene carbonate, propylene carbonate, dimethyl carbonate, diethyl carbonate, methyl ethyl carbonate, γ-butyrolactone, tetrahydrofuran, dioxolane, 1,2-dimethoxymethane, 1,2-dimethoxyethane, diglyme, triglyme, tetraglyme, ethyl acetate, 1,3-dioxolane or water.

The conductive salt in the electrolyte consists of a cation of the formula $M^{e+}$ and an anion of the formula $An^{f-}$ of the formula $(M^{e+})_a(An^{f-})_b$ where e and f are integers depending on the charge of M and An; a and b are integers which represent the molecular composition of the conductive salt.

Cations used in the abovementioned conductive salt are positively charged ions, preferably metals of the first and second main groups, for example lithium, sodium, potassium or magnesium, but also other metals of the transition groups, such as zinc, and organic cations, for example quaternary ammonium compounds such as tetraalkylammonium compounds.

Anions used in said conductive salt are preferably inorganic anions such as hexafluorophosphate, tetrafluoroborate, triflate, hexafluoroarsenate, hexafluoroantimonate, tetrafluoroaluminate, tetrafluoraindate, perchlorate, bis(oxalato)borate, tetrachloroaluminate, tetrachlorogallate, but also organic anions, for example $N(CF_3SO_2)_2^-$, $CF_3SO_3^-$, alkoxides, for example tert-butoxide or iso-propoxide, but also halides such as fluoride, chloride, bromide and iodide.

If ionic liquids are used, they can be used either as solvent of the electrolyte, as conductive salt, or else as complete electrolyte.

2.1) In a Second Aspect, the Present Invention Therefore Also Relates to an Electrode Material Comprising a Conductivity Additive and a Polymer P, Where the Polymer P Comprises n Mutually Joined Repeat Units of the Chemical Structure (I)

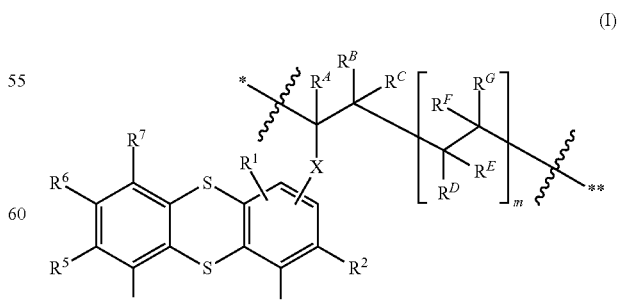

where n is an integer≥4,
where m is an integer≥0, where the repeat units of the chemical structure (I) within the polymer P are the same or at least partly different from one another, where the repeat units of the chemical structure (I) within the polymer P are joined to one another in such a way that the bond identified by "*" in a particular repeat unit is joined to the bond identified by "**" in the adjacent repeat unit, where the $R^A$, $R^B$, $R^C$, $R^D$, $R^E$, $R^F$, $R^G$, $R^1$, $R^2$, $R^3$, $R^4$, $R^5$, $R^6$, $R^7$ radicals are each independently selected from the group consisting of hydrogen, —$NO_2$, —CN, -halogen, —$COOR^8$, —C(=O)$NHR^9$, —$NR^{10}R^{11}$, —$OR^{12}$, —$SR^{13}$, —OP(=O)($O^-(M^{z+})_{1/z})_2$, —OP(=O)($OR^{14}$)$O^-(M^{z+})_{1/z}$, —OP(=O)($OR^{15}$)($OR^{16}$), —S(O)$_2O^-(M^{z+})_{1/z}$, —S(O)$_2OR^{17}$, substituted or unsubstituted (hetero)aromatic radical, substituted or unsubstituted aliphatic radical, where at least one group selected from disulphide, ether, thioether, amino ether, carbonyl, carboxylic ester, sulphonic ester, phosphoric ester is optionally present within the substituted or unsubstituted aliphatic radical, where $R^8$, $R^9$, $R^{10}$, $R^{11}$, $R^{12}$, $R^{13}$, $R^{14}$, $R^{15}$, $R^{16}$, $R^{17}$ are each independently selected from hydrogen, substituted or unsubstituted (hetero)aromatic radical, substituted or unsubstituted aliphatic radical, where at least one group selected from disulphide, ether, thioether, amino ether, carbonyl, carboxylic ester, sulphonic ester, phosphoric ester is optionally present within the substituted or unsubstituted aliphatic radical, where $M^{z+}$ is selected from the group consisting of metallic cation, organic cation, preferably selected from the group consisting of alkali metal cation, alkaline earth metal cation, transition metal cation, tetraalkylammonium cation, imidazolium cation, monoalkylimidazolium cation, dialkylimidazolium cation, where z indicates the number of positive charges of $M^{z+}$, where at least two radicals in ortho positions to one another among the $R^1$, $R^2$, $R^3$ radicals and/or at least two radicals in ortho positions to one another among the $R^4$, $R^5$, $R^6$, $R^7$ radicals may each also be bridged by at least one substituted or unsubstituted (hetero)aromatic ring or by a substituted or unsubstituted aliphatic ring, where at least one group selected from disulphide, ether, thioether, amino ether, carbonyl, carboxylic ester, sulphonic ester, phosphoric ester is optionally present within the substituted or unsubstituted aliphatic ring, where X is selected from the group consisting of &-$(X^1)_{p1}$-[C=$Y^1]_{q1}$-$(X^2)_{p2}$-B-$(X^3)_{p3}$-[C=$Y^2]_{q2}$-$(X^4)_{p4}$-&&, &-$(X^5)_{p5}$-(C=$Y^3)_{q3}$-$(X^6)_{p6}$-&&, direct bond, where p1, q1, p2 are each 0 or 1, with the proviso that t is not simultaneously true that p1=p2=1 and q1=0, where p3, q2, p4 are each 0 or 1, with the proviso that it is not simultaneously true that p3=p4=1 and q2=0, where p5, q3, p6 are each 0 or 1, with the proviso that it is not simultaneously true that p5=p6=1 and q3=0, and that, when p5=1 and q3=0, p6=0, and that it is not true that p5=q3=p6=0, where $Y^1$, $Y^2$, $Y^3$ are each independently selected from O, S, where $X^1$, $X^2$, $X^3$, $X^4$, $X^5$, $X^6$ are each independently selected from —O—, —S—, —NH—, —Nalkyl-, where B is a divalent substituted or unsubstituted (hetero)aromatic radical or a divalent substituted or unsubstituted aliphatic radical, where at least one group selected from disulphide, ether, thioether, amino ether, carbonyl, carboxylic ester, sulphonic ester, phosphoric ester is optionally present within the substituted or unsubstituted aliphatic radical, where "&" denotes the bond to the carbon atom joined to $R^A$, and where "&&" denotes the bond to the thianthrene ring.

2.2) The Present Invention Relates, in a Particular Embodiment of the Second Aspect, to an Electrode Material Comprising a Conductivity Additive and a Polymer P, where the polymer P comprises n mutually joined repeat units of the chemical structure (I)

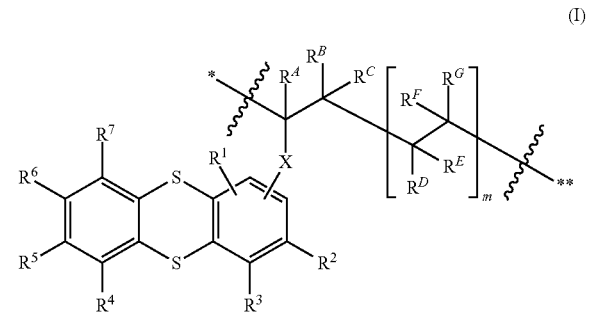

where n is an integer≥4, where m is an integer≥0, where the repeat units of the chemical structure (I) within the polymer P are the same or at least partly different from one another, where the repeat units of the chemical structure (I) within the polymer P are joined to one another in such a way that the bond identified by "*" in a particular repeat unit is joined to the bond identified by "**" in the adjacent repeat unit, where the $R^A$, $R^B$ $R^C$, $R^D$, $R^E$, $R^F$, $R^G$, $R^1$, $R^2$, $R^3$, $R^4$, $R^5$, $R^6$, $R^7$ radicals are each independently selected from the group consisting of hydrogen, —CN, -halogen, —$COOR^8$, —C(=O)$NHR^9$, —$NR^{10}R^{11}$, —$OR^{12}$, —$SR^{13}$, —OP(=O) ($O^-(M^{z+})_{1/z})_2$, —OP(=O)($OR^{14}$)$O^-(M^{z+})_{1/z}$, —OP(=O) ($OR^{15}$)($OR^{16}$), —S(O)$_2O^-(M^{z+})_{1/z}$, —S(O)$_2OR^{17}$, substituted or unsubstituted (hetero)aromatic radical, substituted or unsubstituted aliphatic radical, where at least one group selected from disulphide, ether, thioether, sulphonic ester is optionally present within the substituted or unsubstituted aliphatic radical, where $R^8$, $R^9$, $R^{10}$, $R^{11}$, $R^{12}$, $R^{13}$, $R^{14}$, $R^{15}$, $R^{16}$, $R^{17}$ are each independently selected from hydrogen, substituted or unsubstituted (hetero)aromatic radical, substituted or unsubstituted aliphatic radical, where at least one group selected from disulphide, ether, thioether, sulphonic ester is optionally present within the substituted or unsubstituted aliphatic radical, where $M^{z+}$ is selected from the group consisting of alkali metal cation, where the alkali metal cation is preferably selected from the group consisting of Li$^+$, Na$^+$, K$^+$, alkaline earth metal cation, where the alkaline earth metal cation is preferably selected from the group consisting of Mg$^{2+}$, Ca$^{2+}$, transition metal cation, where the transition metal cation is preferably selected from the group consisting of iron cation, zinc cation, mercury cation, nickel cation, cadmium cation, or tetraalkylammonium cation, imidazolium cation, monoalkylimidazolium cation, dialkylimidazolium cation, where the alkyl groups in the tetraalkylammonium cation, monoalkylimidazolium cation, dialkylimidazolium cation preferably each independently have 1 to 30 carbon atoms, where z indicates the number of positive charges of $M^{z+}$, where at least two radicals in ortho positions to one another among the $R^1$, $R^2$, $R^3$ radicals and/or at least two radicals in ortho positions to one another among the $R^4$, $R^5$, $R^6$, $R^7$ radicals may each also be bridged by at least one substituted or unsubstituted (hetero)aromatic ring or by a substituted or unsubstituted aliphatic ring, where at least one group selected from disulphide, ether, thioether, sulphonic ester is optionally present within the substituted or unsubstituted aliphatic ring, where X is selected from the group consisting of &-$(X^1)_{p1}$-[C=$Y^1$]$_{q1}$-$(X^2)_{p2}$-B-$(X^3)_{p3}$-[C=$Y^2$]$_{q2}$-$(X^4)_{p4}$-&&, &-$(X^5)_{p5}$-(C=$Y^3$)$_{q3}$-$(X^6)_{p6}$-&&, direct bond, where p1, q1, p2 are each 0 or 1, with the proviso that it is not simultaneously true that p1=p2=1 and q1=0, where p3, q2, p4 are each 0 or 1, with the proviso that it is not simultaneously true that p3=p4=1 and q2=0, where p5, q3, p6 are each 0 or 1, with the proviso that it is not simultaneously true that p5=p6=1 and q3=0, and that, when p5=1 and q3=0, p6=0, and that it is not true that p5=q3=p6=0, where $Y^1$, $Y^2$, $Y^3$ are each independently selected from O, S, where $X^1$, $X^2$, $X^3$, $X^4$, $X^5$, $X^6$ are each independently selected from —O—, —S—, —NH—, —Nalkyl-, where B is a divalent substituted or unsubstituted (hetero)aromatic radical or a divalent substituted or unsubstituted aliphatic radical, where at least one group selected from disulphide, ether, thioether, sulphonic ester is optionally present within the substituted or unsubstituted aliphatic radical, where "&" denotes the bond to the carbon atom joined to $R^A$, and where "&&" denotes the bond to the thianthrene ring.

2.3) The Present Invention Relates, in a Preferred Embodiment of the Second Aspect, to an Electrode Material Comprising a Conductivity Additive and a Polymer P, where the polymer P comprises n mutually joined repeat units of the chemical structure (I)

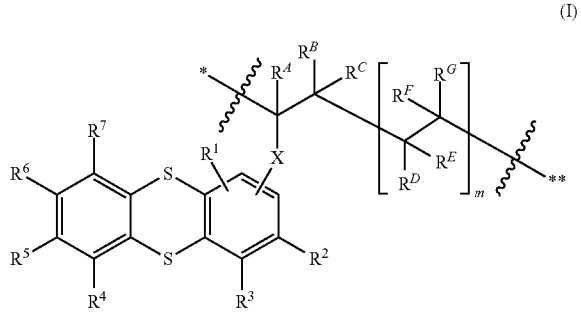
(I)

where n is an integer≥4, where m is an integer≥0, where the repeat units of the chemical structure (I) within the polymer P are the same or at least partly different from one another, where the repeat units of the chemical structure (I) within the polymer P are joined to one another in such a way that the bond identified by "*" in a particular repeat unit is joined to the bond identified by "**" in the adjacent repeat unit, where the $R^A$, $R^B$, $R^C$, $R^D$, $R^E$, $R^F$, $R^G$ radicals are each independently selected from the group consisting of hydrogen, —CN, -halogen, —COOR$^8$, —C(=O)NHR$^9$, —NR$^{10}$R$^{11}$, —OR$^{12}$, —SR$^{13}$, substituted or unsubstituted phenyl radical, substituted or unsubstituted aliphatic radical, where at least one group selected from ether, thioether, sulphonic ester is optionally present within the substituted or unsubstituted aliphatic radical, where the $R^1$, $R^2$, $R^3$, $R^4$, $R^5$, $R^6$, $R^7$ radicals are each independently selected from the group consisting of hydrogen, —CN, -halogen, —COOR$^{18}$, —OR$^{22}$, —SR$^{23}$, —OP(=O)(O$^-$(M$^{z+}$)$_{1/z}$)$_2$, —OP(=O)(OR$^{24}$)O$^-$(M$^{z+}$)$_{1/z}$, —OP(=O)(OR$^{25}$)(OR$^{26}$), —S(O)$_2$O$^-$(M$^{z+}$)$_{1/z}$, —S(O)$_2$OR$^{27}$, substituted or unsubstituted (hetero)aromatic radical, substituted or unsubstituted aliphatic radical, where at least one group selected from disulphide, ether, thioether, sulphonic ester is optionally present within the substituted or unsubstituted aliphatic radical, where R$^8$, R$^9$, R$^{10}$, R$^{11}$, R$^{12}$, R$^{13}$, R$^{18}$, R$^{22}$, R$^{23}$, R$^{24}$, R$^{25}$, R$^{26}$, R$^{27}$ are each independently selected from hydrogen, substituted or unsubstituted (hetero)aromatic radical, substituted or unsubstituted aliphatic radical, where at least one group selected from disulphide, ether, thioether, sulphonic ester is optionally present within the substituted or unsubstituted aliphatic radical, where $M^{z+}$ is selected from the group consisting of Li$^+$, Na$^+$, K$^+$, Mg$^{2+}$, Ca$^{2+}$, Zn$^{2+}$, Fe$^{2+}$, Fe$^{3+}$, Cd$^{2+}$, Hg$^+$, Hg$^{2+}$, Ni$^{2+}$, Ni$^{3+}$, Ni$^{4+}$, tetraalkylammonium cation, imidazolium cation, monoalkylimidazolium cation, dialkylimidazolium cation, where the alkyl groups in the tetraalkylammonium cation, monoalkylimidazolium cation, dialkylimidazolium cation each independently have 1 to 10 carbon atoms, where z indicates the number of positive charges of $M^{z+}$, where at least two radicals in ortho positions to one another among the $R^1$, $R^2$, $R^3$ radicals and/or at least two radicals in ortho positions to one another among the $R^4$, $R^5$, $R^6$, $R^7$ radicals may each also be bridged by at least one substituted or unsubstituted (hetero)aromatic ring or by a substituted or unsubstituted aliphatic ring, where at least one group selected from disulphide, ether, thioether, sulphonic ester is optionally present within the substituted or unsubstituted aliphatic ring, where X is selected from the group consisting of &-$(X^1)_{p1}$-[C=$Y^1$]$_{q1}$-$(X^2)_{p2}$-B-$(X^3)_{p3}$-[C=$Y^2$]$_{q2}$-$(X^4)_{p4}$-&&, &-$(X^5)_{p5}$-(C=$Y^3$)$_{q3}$-$(X^6)_{p6}$-&&, direct bond, where p1, q1, p2 are each 0 or 1, with the proviso that it is not simultaneously true that p1 p2=1 and q1=0, where p3, q2, p4 are each 0 or 1, with the proviso that it is not simultaneously true that p3=p4=1 and q2=0, where p5, q3, p6 are each 0 or 1, with the proviso that it is not simultaneously true that p5=p6=1 and q3=0, and that, when p5=1 and q3=0, p6=0, and that it is not true that p5=q3=p6=0, where $Y^1$, $Y^2$, $Y^3$ are each independently selected from O, S, where $X^1$, $X^2$, $X^3$, $X^4$, $X^5$, $X^6$ are each independently selected from —O—, —S—, where B is a divalent substituted or unsubstituted (hetero)aromatic radical or a divalent substituted or unsubstituted aliphatic radical, where at least one group selected from ether, thioether is optionally present within the substituted or unsubstituted aliphatic radical, where "&" denotes the bond to the carbon atom joined to $R^A$, and where "&&" denotes the bond to the thianthrene ring.

2.4) The Present Invention Relates, in a More Preferred Embodiment of the Second Aspect, to an Electrode Material Comprising a Conductivity Additive and a Polymer P, where the polymer P comprises n mutually joined repeat units of the chemical structure (I)

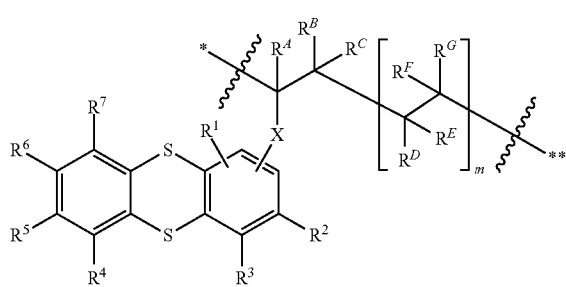

(I)

where n is an integer≥4,
where m is an integer≥0,
where the repeat units of the chemical structure (I) within the polymer P are the same or at least partly different from one another,
where the repeat units of the chemical structure (I) within the polymer P are joined to one another in such a way that the bond identified by "*" in a particular repeat unit is joined to the bond identified by "**" in the adjacent repeat unit,
where the $R^A$, $R^B$, $R^C$, $R^D$, $R^E$, $R^F$, $R^G$ radicals are each independently selected from the group consisting of hydrogen, —CN, -halogen, —COOR$^8$, —OR$^{12}$, —SR$^{13}$, substituted or unsubstituted phenyl radical, substituted or unsubstituted alkyl radical having preferably 1 to 10 carbon atoms, where at least one group selected from ether, thioether is optionally present within the substituted or unsubstituted alkyl radical,
where the $R^1$, $R^2$, $R^3$, $R^4$, $R^5$, $R^6$, $R^7$ radicals are each independently selected from the group consisting of hydrogen, -halogen, —COOR$^{18}$, —OR$^{22}$, —SR$^{23}$, —OP(=O)(O$^-$(M$^{z+}$)$_{1/z}$)$_2$, —OP(=O)(OR$^{24}$)O$^-$(M$^{z+}$)$_{1/z}$, —OP(=O)(OR$^{25}$)(OR$^{26}$), —S(O)$_2$O$^-$(M$^{z+}$)$_{1/z}$, —S(O)$_2$OR$^{27}$, substituted or unsubstituted alkyl radical having preferably 1 to 10 carbon atoms, where at least one group selected from ether, thioether, sulphonic ester is optionally present within the substituted or unsubstituted alkyl radical,
where $R^8$, $R^{12}$, $R^{13}$, $R^{18}$, R22, $R^{23}$, $R^{24}$, $R^{25}$, $R^{26}$, $R^{27}$ are each independently selected from hydrogen, substituted or unsubstituted (hetero)aromatic radical, substituted or unsubstituted alkyl radical having preferably 1 to 10 carbon atoms, where at least one group selected from disulphide, ether, thioether, sulphonic ester is optionally present within the substituted or unsubstituted alkyl radical,
where $M^{z+}$ is selected from the group consisting of Li$^+$, Na$^+$, K$^+$, Mg$^{2+}$, Ca$^{2+}$, Zn$^{2+}$, Fe$^{2+}$, Fe$^{3+}$, Cd$^{2+}$, Hg$^+$, Hg$^{2+}$, Ni$^{2+}$, Ni$^{3+}$, Ni$^{4+}$,
where z in the case of each of Li$^+$, Na$^+$, K$^+$, Hg$^+$=1,
where z in the case of each of Mg$^{2+}$, Ca$^{2+}$, Zn$^{2+}$, Cd$^{2+}$, Hg$^{2+}$, Ni$^{2+}$, Fe$^{2+}$=2,
where z in the case of Fe$^{3+}$, Ni$^{3+}$=3,
where z in the case of Ni$^{4+}$=4,
where X is selected from the group consisting of &-(X$^1$)$_{p1}$-[C=Y$^1$]$_{q1}$-(X$^2$)$_{p2}$-B-(X$^3$)$_{p3}$-[C=Y$^2$]$_{q2}$-(X$^4$)$_{p4}$-&&, &-(X$^5$)$_{p5}$-(C=Y$^3$)$_{q3}$-(X$^6$)$_{p6}$-&&, direct bond, where p1, q1, p2 are each 0 or 1, with the proviso that it is not simultaneously true that p1=p2=1 and q1=0,
where p3, q2, p4 are each 0 or 1, with the proviso that it is not simultaneously true that p3=p4=1 and q2=0,
where p5, q3, p6 are each 0 or 1, with the proviso that it is not simultaneously true that p5=p6=1 and q3=0, and that, when p5=1 and q3=0, p6=0, and that it is not true that p5=q3=p6=0,
where $Y^1$, $Y^2$, $Y^3$ are each independently selected from O, S,
where $X^1$, $X^2$, $X^3$, $X^4$, $X^5$, $X^6$ are each independently selected from —O—, —S—,
where B is a divalent substituted or unsubstituted (hetero) aromatic radical, preferably phenylene or tolylene, or a divalent substituted or unsubstituted alkylene or alkenylene radical having preferably 1 to 10 carbon atoms, where at least one group selected from ether, thioether is optionally present within the substituted or unsubstituted alkylene or alkenylene radical,
where "&" denotes the bond to the carbon atom joined to $R^A$,
and where "&&" denotes the bond to the thianthrene ring.

2.5) The Present Invention Relates, in a More Preferred Embodiment of the Second Aspect, to an Electrode Material Comprising a Conductivity Additive and a Polymer P, where the polymer P comprises n mutually joined repeat units of the chemical structure (I)

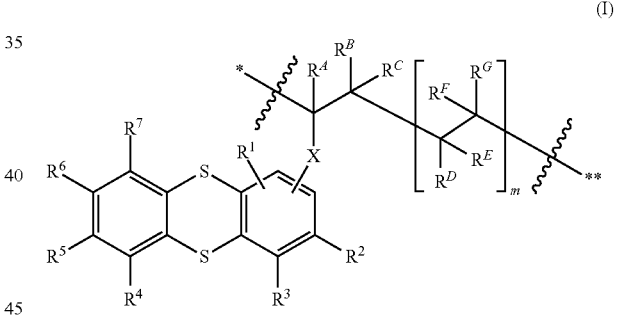

(I)

where n is an integer≥4,
where m is an integer≥0,
where the repeat units of the chemical structure (I) within the polymer P are the same or at least partly different from one another,
where the repeat units of the chemical structure (I) within the polymer P are joined to one another in such a way that the bond identified by "*" in a particular repeat unit is joined to the bond identified by "*" in the adjacent repeat unit,
where the $R^A$, $R^B$, $R^C$, $R^D$, $R^E$, $R^F$, $R^G$ radicals are each independently selected from the group consisting of hydrogen, —CN, -halogen, —COOR$^8$, substituted or unsubstituted phenyl radical, substituted or unsubstituted alkyl radical having preferably 1 to 10 carbon atoms,
where the $R^1$, $R^2$, $R^3$, $R^4$, $R^5$, $R^6$, $R^7$ radicals are each independently selected from the group consisting of hydrogen, -halogen, —COOR$^{18}$, —OR$^{22}$, —SR$^{23}$, substituted or unsubstituted alkyl radical having preferably 1 to 10 carbon atoms,
where $R^8$, $R^{18}$, $R^{22}$, $R^{23}$ are each independently selected from hydrogen, substituted or unsubstituted alkyl radical having especially 1 to 10 carbon atoms, preferably substituted or unsubstituted alkyl radical having more preferably 1 to 10 carbon atoms, where X is selected from the group consisting of &-$(X^1)_{p1}$-$[C{=}Y^1]_{q1}$-$(X^2)_{p2}$-B-$(X^3)_{p3}$-$[C{=}Y^2]_{q2}$-$(X^4)_{p4}$-&&, &-$(X^5)_{p5}$-$(C{=}Y^3)_{q3}$-$(X^6)_{p6}$-&&, direct bond, where p1, q1, p2 are each 0 or 1, with the proviso that it is not simultaneously true that p1=p2=1 and q1=0, where p3, q2, p4 are each 0 or 1, with the proviso that it is not simultaneously true that p3=p4=1 and q2=0, where p5, q3, p6 are each 0 or 1, with the proviso that it is not simultaneously true that p5=p6=1 and q3=0, and that, when p5=1 and q3=0, p6=0, and that it is not true that p5=q3=p6=0, where $Y^1$, $Y^2$, $Y^3$ are each independently selected from O, S, where $X^1$, $X^2$, $X^3$, $X^4$, $X^5$, $X^6$ are each independently selected from —O—, —S—, where B is selected from the group consisting of phenylene, tolylene, divalent substituted or unsubstituted alkylene or alkenylene radical having preferably 1 to 10 carbon atoms, where "&" denotes the bond to the carbon atom joined to $R^A$, and where "&&" denotes the bond to the thianthrene ring.

2.6) The Present Invention Relates, in a More Preferred Embodiment of the Second Aspect Still, to an Electrode Material Comprising a Conductivity Additive and a Polymer P, where the polymer P comprises n mutually joined repeat units of the chemical structure (I)

$$\text{(I)}$$

where n is an integer≥4, where m is an integer≥0, where the repeat units of the chemical structure (I) within the polymer P are the same or at least partly different from one another, where the repeat units of the chemical structure (I) within the polymer P are joined to one another in such a way that the bond identified by "*" in a particular repeat unit is joined to the bond identified by "**" in the adjacent repeat unit, where the $R^A$, $R^B$, $R^C$, $R^D$, $R^E$, $R^F$, $R^G$ radicals are each independently selected from the group consisting of hydrogen, —CN, -halogen, —COOR$^8$, phenyl radical unsubstituted or substituted by a group selected from alkyl, alkenyl, alkynyl, and of substituted or unsubstituted alkyl radical having preferably 1 to 10 carbon atoms, where the $R^1$, $R^2$, $R^3$, $R^4$, $R^5$, $R^6$, $R^7$ radicals are each independently selected from the group consisting of hydrogen, -halogen, —COOR$^{18}$, —OR$^{22}$, —SR$^{23}$, substituted or unsubstituted alkyl radical having preferably 1 to 10 carbon atoms, where $R^8$, $R^{18}$, $R^{22}$, $R^{23}$ are each independently selected from hydrogen, substituted or unsubstituted alkyl radical having especially 1 to 10 carbon atoms, preferably substituted or unsubstituted alkyl radical having more preferably 1 to 10 carbon atoms, where X is selected from the group consisting of &-$(X^1)_{p1}$-$[C{=}Y^1]_{q1}$-$(X^2)_{p2}$-B-$(X^3)_{p3}$-$[C{=}Y^2]_{q2}$-$(X^4)_{p4}$-&&, &-$(X^5)_{p5}$-$(C{=}Y^3)_{q3}$-$(X^6)_{p6}$-&&, direct bond, where p1, q1, p2 are each 0 or 1, with the proviso that it is not simultaneously true that p1=p2=1 and q1=0, where p3, q2, p4 are each 0 or 1, with the proviso that it is not simultaneously true that p3=p4=1 and q2=0, where p5, q3, p6 are each 0 or 1, with the proviso that it is not simultaneously true that p5=p6=1 and q3=0, and that, when p5=1 and q3=0, p6=0, and that it is not true that p5=q3=p6=0, where $Y^1$, $Y^2$, $Y^3$ are each independently selected from O, S, where $X^1$, $X^2$, $X^3$, $X^4$, $X^5$, $X^6$ are each independently selected from —O—, —S—, where B is selected from the group consisting of phenylene, tolylene, divalent substituted or unsubstituted alkylene or alkenylene radical having preferably 1 to 10 carbon atoms, where "&" denotes the bond to the carbon atom joined to $R^A$, and where "&&" denotes the bond to the thianthrene ring.

2.7) The Present Invention Relates, in a More Preferred Embodiment of the Second Aspect Still, to an Electrode Material Comprising a Conductivity Additive and a Polymer P, where the polymer P comprises n mutually joined repeat units of the chemical structure (I)

$$\text{(I)}$$

where n is an integer≥4, where m is an integer≥0, where the repeat units of the chemical structure (I) within the polymer P are the same or at least partly different from one another, where the repeat units of the chemical structure (I) within the polymer P are joined to one another in such a way that the bond identified by "*" in a particular repeat unit is joined to the bond identified by "*" in the adjacent repeat unit, where the $R^A$, $R^B$, $R^C$, $R^D$, $R^E$, $R^F$ radicals are each independently selected from the group consisting of hydrogen, -halogen, alkyl group having preferably 1 to 6 carbon atoms, where the $R^D$, $R^G$ radicals are independently selected from the group consisting of hydrogen, -halogen, alkyl radical having preferably 1 to 6 carbon atoms, —COOR$^8$, phenyl radical unsubstituted or substituted by a group selected from alkyl, preferably having 1 to 10 carbon atoms, alkenyl, preferably having 2 to 10 carbon atoms, and of —CN, where the $R^1$, $R^2$, $R^3$, $R^4$, $R^5$, $R^6$, $R^7$ radicals are each independently selected from the group consisting of hydrogen, -halogen, —COOR$^{18}$, —OR$^{22}$, —SR$^{23}$, alkyl radical having preferably 1 to 6 carbon atoms, where $R^8$, $R^{18}$, $R^{22}$, $R^{23}$ are each independently selected from hydrogen, alkyl radical having preferably 1 to 6 carbon atoms, preferably alkyl radical having more preferably 1 to 6 carbon atoms, where X is selected from the group consisting of &-$(X^1)_{p1}$-$[C=Y^1]_{q1}$-$(X^2)_{p2}$-B-$(X^3)_{p3}$-$[C=Y^2]_{q2}$-$(X^4)_{p4}$-&&, direct bond, where p1, q1, p2 are each 0 or 1, with the proviso that it is not simultaneously true that p1=p2=1 and q1=0, where p3, q2, p4 are each 0 or 1, with the proviso that it is not simultaneously true that p3=p4=1 and q2=0, where $Y^1$, $Y^2$ are each independently selected from O, S, where $X^1$, $X^2$, $X^3$, $X^4$ are each independently selected from —O—, —S—, where B is selected from the group consisting of phenylene, tolylene, alkylene radical having preferably 1 to 6 carbon atoms, alkenylene radical having preferably 1 to 6 carbon atoms, where "&" denotes the bond to the carbon atom joined to $R^A$, and where "&&" denotes the bond to the thianthrene ring.

2.8) The Present Invention Relates, in the Most Preferred Embodiment of the Second Aspect, to An Electrode Material Comprising a Conductivity Additive and a Polymer P, where the polymer P comprises n mutually joined repeat units of the chemical structure (I)

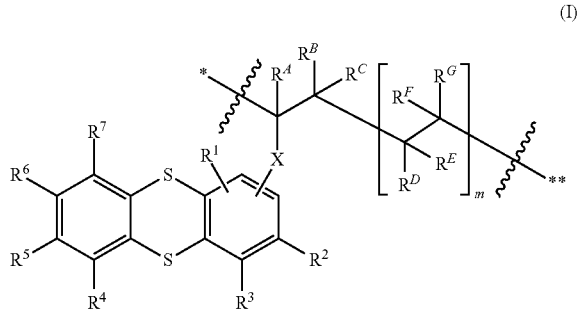

(I)

where n is an integer≥4,
where m is an integer≥0,
where the repeat units of the chemical structure (I) within the polymer P are the same or at least partly different from one another,
where the repeat units of the chemical structure (I) within the polymer P are joined to one another in such a way that the bond identified by "*" in a particular repeat unit is joined to the bond identified by "**" in the adjacent repeat unit,
where the $R^A$, $R^B$, $R^C$, $R^E$, $R^F$ radicals are each independently selected from the group consisting of hydrogen, —F, —Cl; preferably, $R^A$=$R^B$=$R^C$=$R^E$=$R^F$=hydrogen, where the $R^D$, $R^G$ radicals are each independently selected from the group consisting of hydrogen, —F, —Cl, phenyl radical, phenyl radical substituted by at least one, preferably exactly one, vinyl group; preferably, the $R^D$, $R^G$ radicals are each independently selected from the group consisting of hydrogen, —F, —Cl, phenyl radical; even more preferably, $R^D$=$R^G$=hydrogen, where the $R^1$, $R^2$, $R^3$, $R^4$, $R^5$, $R^6$, $R^7$ radicals are each independently selected from the group consisting of hydrogen, —F, —Cl, —OR$^{22}$, —SR$^{23}$, alkyl radical having 1 to 6 carbon atoms; preferably, $R^1$=$R^2$=$R^3$=$R^4$=$R^5$=$R^6$=$R^7$=hydrogen, where the $R^{22}$, $R^{23}$ radicals are each independently selected from alkyl radical having 1 to 6 carbon atoms, where X is selected from the group consisting of direct bond, &-O—CH=CH=CH-&&, &-CH=CH—O-&&, &-O—CH$_2$—CH=CH-&&, &-CH=CH—CH$_2$-O-&&, phenylene, &-CH$_2$-phenylene-&&, &-phenylene-CH$_2$-&&, alkylene having 1 to 6 carbon atoms;

preferably, X=direct bond, where "&" denotes the bond to the carbon atom joined to $R^A$, and where "&&" denotes the bond to the thianthrene ring.

Even more preferably, in the aforementioned embodiments of the second aspect of the invention, $R^1$ is in the meta position to $R^2$ and the bond joined to X is in the ortho position to $R^2$.

The polymers according to the invention, in the second aspect of the present invention, by contrast with those described by Speer et aL, have a backbone derived from polyethylene. It has been found that, surprisingly, the polymers according to the invention are suitable for use in batteries, which leads to a higher capacity of the corresponding battery, even after going through further charging/discharging cycles (also referred to as "cycling stability").

The polymer P according to the invention, in the second aspect of the present invention, comprises n mutually joined repeat units of the chemical structure (I).

In this context, n is an integer ≥4, especially an integer≥4 and ≤5000, preferably an integer≥10 and ≤1000.

In this context, m is an integer≥0, especially an integer≥0 and ≤5000, preferably an integer≥0 and ≤1000.

In this context, the average molar mass of the polymer P in the second aspect of the present invention (determined by means of size exclusion chromatography with a polystyrene standard; DIN 55672-2:2015-02) is especially 700 to 2,000,000 g/mol, preferably 1000 to 1,000,000 g/mol, more preferably 3000 to 300,000 g/mol, even more preferably 35,500 g/mol.

In the second aspect of the present invention, the repeat units of the chemical structure (I) within the polymer are the same or at least partly different from one another.

"At least partly different from one another" in the context of the present invention means that at least two repeat units of the chemical structure (I) in the polymer P differ from one another; more particularly, this means that at least two of the n mutually joined repeat units of the chemical structure (I) differ in at least one of the $R^A$, $R^B$, $R^C$, $R^D$, $R^E$, $R^F$, $R^G$, $R^1$, $R^2$, $R^3$, $R^4$, $R^5$, $R^6$, $R^7$, X radicals and/or in the position of $R^1$ on the thianthrene ring and/or in the value of m.

At the same time, the repeat units of the chemical structure (I) within the polymer are joined to one another in such a way that the bond identified by "*" in a particular repeat unit is joined to the bond identified by "**" in the adjacent repeat unit.

In this invention, in the chemical structure (I), the $R^1$ radical and the X radical are joined to the thianthrene radical via one bond each, the respective bond being shown as projecting into the thianthrene radical. This means that the following two options for the chemical structure (I) are encompassed:
(i) $R^1$ in the chemical structure (I) is in the meta position to $R^2$ and the bond joined to X is in the ortho position to $R^2$.
(i) $R^1$ in the chemical structure (I) is in the ortho position to $R^2$ and the bond joined to X is in the meta position to $R^2$.

Option (I) is the more preferred option in the second aspect of the present invention as well.

The end groups of the first repeat unit of the polymer according to the invention which is present for these in the chemical structure (I) at the bond defined by "*", and the end groups of the nth repeat unit of the polymer according to the invention which is present for these in the chemical structure (I) at the bond defined by "**", are not particularly restricted and, more particularly, are a result of the polymerization method used in the method for preparing the polymer according to the invention. Thus, they may be termination fragments of an initiator or a repeat unit. Preferably, these end groups are selected from hydrogen, halogen, hydroxyl, unsubstituted aliphatic radical or aliphatic radical substituted by —CN, —OH, halogen (which may especially be an unsubstituted or correspondingly substituted alkyl group), (hetero)aromatic radical, which is preferably a phenyl radical, benzyl radical or α-hydroxybenzyl.

In the case of X, "&&" denotes the bond from X to the thianihrene ring, and "&" the bond that joins X to $R^4$.

An electrode material is especially an electrode slurry or a surface coating of electrode elements for electrical charge storage means.

The conductivity additive is at least one electrically conductive material, especially selected from the group consisting of carbon materials, electrically conductive polymers, metals, semimetals, (semi)metal compounds, preferably selected from carbon materials, electrically conductive polymers.

The conductivity additive is more preferably selected from carbon materials. Carbon materials are especially selected from the group consisting of carbon fibres, carbon nanotubes, graphite, graphene, carbon black, fullerenes.

Electrically conductive polymers are especially selected from the group consisting of polypyrroles, polyanilines, polyphenylenes, polypyrenes, polyazulenes, polynaphthylenes, polycarbazoles, polyindoles, polyazepines, polyphenylene sulphides, polythiophenes, polyacetylenes, poly(3,4-ethylendioxythiophene) polystyrenesulphonate (=PEDOT:PSS), polyarcenes, poly-(ρ-phenylenevinylenes).

Metals are especially selected from the group consisting of zinc, iron, copper, silver, gold, chromium, nickel, tin, indium.

Semimetals are especially selected from silicon, germanium, gallium, arsenic, antimony, selenium, tellurium, polonium.

According to the invention, "(semi)metal compounds" means compounds of the metals and sernimetals with one another or with other elements. (Semi)metal compounds are especially selected from oxides and sulphides of zinc, iron, copper, chromium, nickel, tin, indium, arsenides of germanium, gallium, or substances such as indium tin oxide (ITO), indium zinc oxide (IZO), antimony zinc oxide (AZO), fluorine tin oxide (FTO) or antimony tin oxide (ATO).

In a further preferred embodiment, the redox-active electrode material also comprises at least one binder additive. These are familiar to those skilled in the art and are especially materials having binder properties and preferably polymers selected from the group consisting of polytetrafluoroethylene, polyvinylidene fluoride, polyhexafluoropropylene, polyvinyl chloride, polycarbonate, polystyrene, polyacrylates, polymethacrylates, polysulphones, cellulose derivatives, polyurethanes.

The present invention also relates to an electrode (another word "electrode element") comprising the inventive electrode material of the second aspect of the present invention.

The present invention also relates to an electrical charge storage means, especially a secondary battery, comprising the electrode according to the invention.

In the embodiment in which the redox-active electrode material takes the form of an at least partial surface coating of electrode elements for electrical charge storage means, especially secondary batteries, an electrode element has an at least partial layer on a substrate surface. This layer especially comprises a composition comprising the polymer according to the invention as redox-active material for charge storage and especially at least also a conductivity additive and especially also at least one binder additive.

The application of this composition (another expression for composition: "composite") on the substrate is possible by means of methods known to those skilled in the art. More particularly, the polymer according to the invention is applied on the substrate with the aid of an electrode slurry.

The substrate of the electrode element is especially selected from conductive materials, preferably metals, carbon materials, oxide substances.

Metals suitable with preference as substrate for the electrode element are selected from platinum, gold, iron, copper, aluminium, zinc or a combination of these metals. Preferred carbon materials suitable as substrate for the electrode element are selected from glassy carbon, graphite foil, graphene, carbon skins. Preferred oxide substances suitable as substrate for the electrode element are, for example, selected from the group consisting of indium tin oxide (ITO), indium zinc oxide (IZO), antimony zinc oxide (AZO), fluorine tin oxide (FTO) or antimony tin oxide (ATO), zinc oxide (ZO).

The surface layer of the electrode element comprises at least the polymer used in accordance with the invention as redox-active material for charge storage and at least a conductivity additive and a binder additive.

The polymer used in accordance with the invention is especially applied to the substrate of the electrode element in an electrode slurry.

The electrode slurry is a solution or suspension and comprises the polymer according to the invention and especially the above-described conductivity additive and the above-described binder additive, The electrode slurry preferably comprises a solvent and further constituents comprising redox-active material for storage of electrical energy (which is especially the polymer according to the invention), and preferably also the conductivity additive and the binder additive.

In the further constituents, preferably, the proportion of the redox-active material for storage of electrical energy (which is especially the polymer according to the invention) is from 5 to 100 per cent by weight, the proportion of the conductivity additive from 0 to 80 and preferably 5 to 80 per cent by weight, and the proportion of binder additive 0 to 10 and preferably 1 to 10 per cent by weight, where the sum total is 100 per cent by weight.

Solvents used for the electrode slurry are independently one or more solvents, preferably solvents having a high boiling point, more preferably selected from the group consisting of N-methyl-2-pyrrolidone, water, dimethyl sulphoxide, ethylene carbonate, propylene carbonate, dimethyl carbonate, methyl ethyl carbonate, y-butyrolactone, tetrahydrofuran, dioxolane, sulpholane, N,N'-dimethylformamide, N,N'-dimethylacetamide. The concentration of the redox-active material, especially of the polymer according to the invention, for storage of electrical energy in the abovementioned electrode slurry is preferably between 1 and 100 mg/ml, more preferably between 5 and 50 mg/ml.

If the polymer used in accordance with the invention is used as redox-active material for electrical charge storage means as the positive electrode element, the redox-active material used for electrical charge storage in the negative electrode is a material which exhibits a redox reaction at a lower electrochemical potential than the polymer of this invention. Preference is given to those materials selected from the group consisting of carbon materials, which are especially selected from the group consisting of graphite, graphene, carbon black, carbon fibres, carbon nanotubes, metals or alloys, which are especially selected from the group consisting of lithium, sodium, magnesium, lithium-aluminium, Li—Si, Li—Sn, Li—Ti, Si, SiO, $SiO_2$, Si—$SiO_2$ complex, Zn, Sn, SnO, $SnO_2$, PbO, $PbO_2$, GeO, $GeO_2$, $WO_2$, $MoO_2$, $Fe_2O_3$, $Nb_2O_5$, $TiO_2$, $Li_4Ti_5O_{12}$, and $Li_2Ti_3O_7$, and organic redox-active materials. Examples of organic redox-active materials are compounds having a stable organic radical, compounds having an organosulphur unit, having a quinone structure, compounds having a dione system, conjugated carboxylic acids and salts thereof, compounds having a phthalimide or naphthalimide structure, compounds having a disulphide bond and compounds having a phenanthrene structure and derivatives thereof. If an abovementioned redox-active oligomeric or polymeric compound is used in the negative electrode, this compound may also be a composite, i.e. a composition, consisting of this oligomeric or polymeric compound, a conductivity additive and a binder additive in any ratio. The conductivity additive in this case too is especially at least one electrically conductive material, preferably selected from the group consisting of carbon materials, electrically conductive polymers, and especially carbon materials. Carbon materials are especially selected from the group consisting of carbon fibres, carbon nanotubes, graphite, carbon black, graphene, and are more preferably carbon fibres. Electrically conductive polymers are especially selected from the group consisting of polyanilines, polythiophenes, polyacetylenes, poly(3,4-ethylene-dioxythiophene) polystyrenesulphonate (="PEDOT:PSS"), polyarcenes. Binder additives in this case too are especially materials having binder properties and are preferably polymers selected from the group consisting of polytetrafluoroethylene, polyvinylidene fluoride, polyhexafluoropropylene, polyvinyl chloride, polycarbonate, polystyrene, polyacrylates, polymethacrylates, polysulphones, cellulose derivatives, polyurethanes.

This composite may, as described above, be present as a layer on a substrate through a known film-forming process with the aid of an electrode slurry.

FIGURES

FIG. 1 (abbreviated to "FIG. 1") shows a cyclic voltammogram of a monomer 2 (prepared according to Example 1) in $CH_2Cl_2$ (0.1 M $TBAPF_6$, scan rate 100 mV s$^{-1}$). The x axis indicates the potential V; the y axis indicates the current I in mA.

Figure 2:
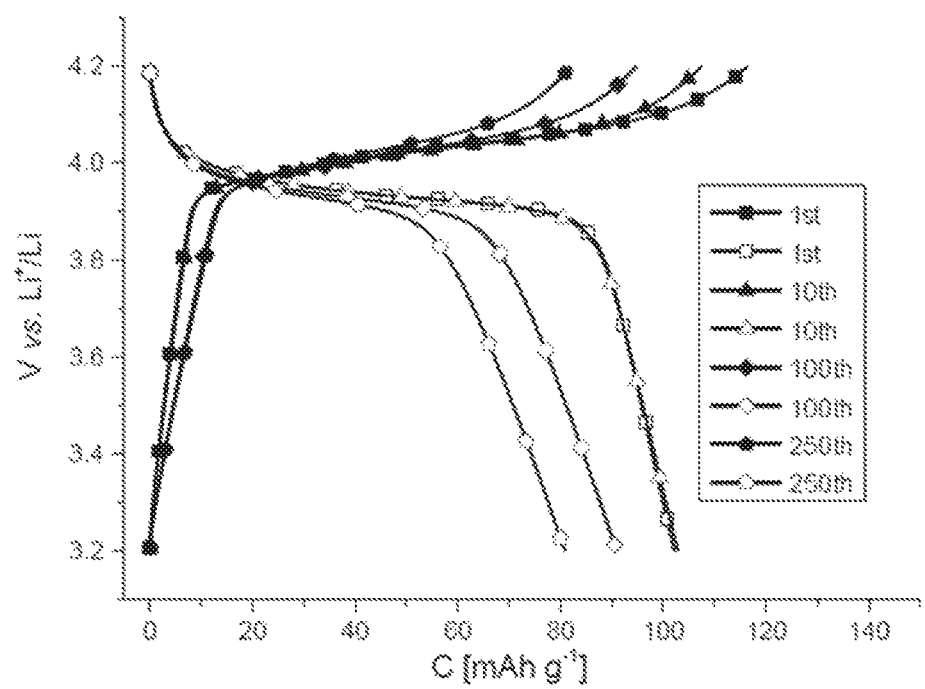

FIG. 2 (abbreviated to "FIG. 2") indicates the measured voltages V (y axis) against the capacity (x axis) of an electrode according to the invention produced with 3 after 1 or 10 or 100 or 250 charge-discharge cycle(s) (charging rate=1 C, i.e. full charge within 60 minutes). The filled boxes in the diagram correspond to the charging cycles, the empty boxes to the discharging cycles.

Figure 3:
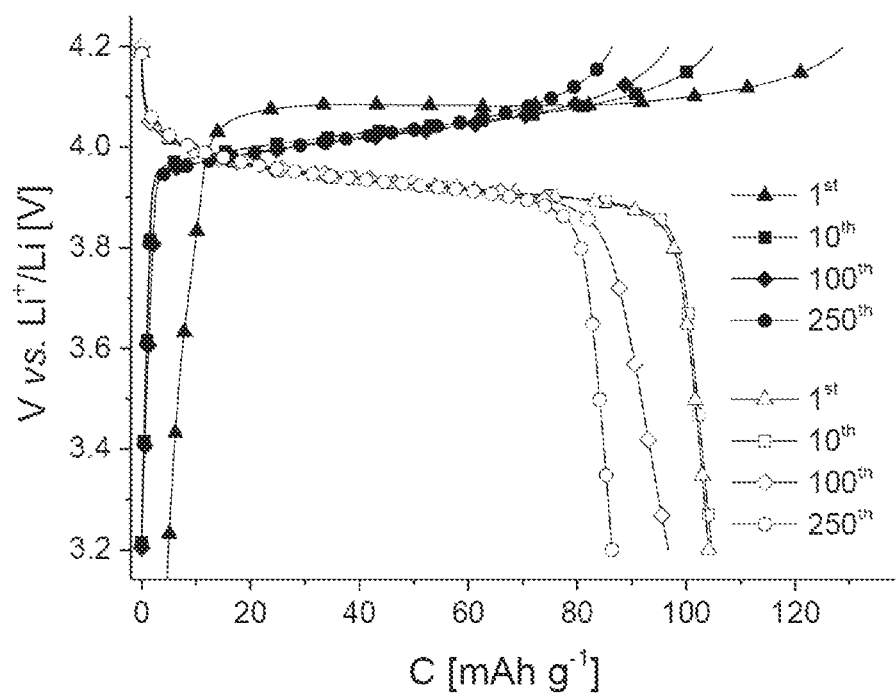

FIG. 3 (abbreviated to "FIG. 3") indicates the measured voltages V (y axis) against the capacity (x axis) of an electrode according to the invention produced with 4 after 1 or 10 or 100 or 250 charge-discharge cycle(s) (charging rate=1 C, i.e. full charge within 60 minutes). The filled boxes in the diagram correspond to the charging cycles, the empty boxes to the discharging cycles.

The examples which follow are intended to elucidate the present invention without limiting said invention thereto.

EXAMPLES

1. General Remarks 1.1 Abbreviations

AIBN—azobis(isobutyronitrile); DMAc—dimethy acetamide; DMAP—dimethylaminopyridine; DMF—dimethylformamide; DVB—divinylbenzene; JohnPhos—(2-biphenyl)di-tert-butylphosphine; $NEt_3$—triethylamine; Pd(dba)$_2$—bis(dibenzylideneacetone)palladium(0); NMP—N-methyl-2-pyrrolidone; PS—polystyrene; SEC—size exclusion chromatography; $TBAClO_4$—tetrabutylammonium perchlorate; TBAF—tetrabutylammonium fluoride; $TBAPF_6$—tetrabutylammonium hexailuorophosphate; THF—tetrahydrofuran; Tol.—toluene; TVCT—2,4,6,8-tetramethyl-2,4,6,8-tetravinylcyclotetrasiloxane.

The numbers in brackets given in the reaction schemes which follow relate to the respective section in which the synthesis has been described.

1.2 Test Methods $^1$H and $^{13}$C NMR spectra were recorded with a Bruker AC 300 (300 MHz) spectrometer at 298 K. For cyclic voltammetry and galvanostatic experiments, a Biologic VMP 3 potentiostat was available. Size exclusion chromatography was conducted on an Agilent 1200 series system (degasser: PSS, pump: G1310A, autosampler: G1329A, oven: Techlab, DAD detector: G1315D, RI detector: G1362A, eluent: DMAc+0.21% LiCl, 1 ml/min, temperature: 40° C., column: PSS GRAM guard/1000/30 Å).

2. Inventive Examples 2.1I1: Synthesis and Polymerization of 2-vinylthianthrene to Give poly-(2-vinylthianthrene) 3 or 4

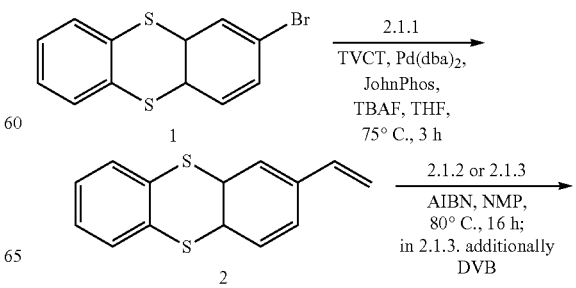

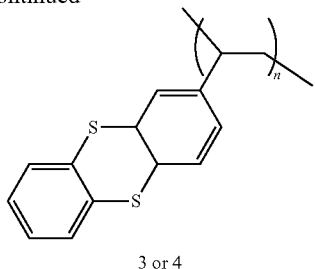

3 or 4

2.1.1 Synthesis of 2-vinylthianthrene 2

2-Bromothianthrene (2.07 g, 7 mmol), bis(dibenzylideneacelone)palladium(0) (121 mg, 0.21 mmol) and (2-biphenyl)di-teat-butylphosphine (125 mg, 0.42 mmol) were freed of air and water by repeated evacuation and filling with inert gas. Subsequently, THF (14 ml), tetrabutylammonium fluoride solution (7,7 ml, 7,7 mmol, 1 M in THF) and 2,4,6,8-tetramethyl-2,4,6,8-tetravinylcyclotetrasiloxane (1.21 ml, 3.5 mmol) were added and the solution was heated to 75° C. On completion of conversion (monitoring by TLC), the reaction mixture was cooled to room temperature and extracted with ethyl acetate and water. The organic phase was dried with $MgSO_4$ and the solvent was removed under reduced pressure. The crude product was purified by column chromatography (silica gel, heptane). 1.59 g (6.57 mmol, 94%) of 2 were obtained as a white solid.

A cyclic voltammogram with 2 was recorded. The cyclic voltammogram is shown in FIG. 1 ("FIG. 1").

$^1$H NMR ($CDCl_3$, 300 MHz, ppm): δ 7.56-7.45 (m, 4H), 7.35-7.26 (m, 3H), 6.71 (dd, 1H). 5.81 (d, 1H), 5.33 (d, 1H).

2.1.2 Synthesis of poly(2-vinylthianthrene) 3

A 1 M solution of 2 (242 mg, 1 mmol) in dry DMF and AIBN (4.9 mg, 0.03 mmol) was inertized by 3 freeze-pump-thaw cycles. The solution was then stirred at 80° C. for 16 hours. The polymer was precipitated and washed in diethyl ether (15 ml) and then dried under reduced pressure. This gave 208 mg (0.86 mmol, 86%) of 3 as a white solid.

$^1$H NMR (DMF, 300 MHz, ppm): δ 7.61-7.01 (b, 7H), 1.5-0.8 (b, 3H).

SEC (DMAc, 0.21% LiCl, PS standard): $M_n$=35,500, PDI 4.8.

2.1.3 Synthesis of poly(2-vinylthianthrene-co-divinylbenzene) 4

A solution of 2 (727 mg, 3 mmol), divinylbenzene (3.9 mg, 0.03 mmol) and AIBN (14.8 mg, 0.09 mmol) in 3 ml of dry NMP was inertized by 3 freeze-pump-thaw cycles. The solution was then stirred at 75° C. for 24 hours. The polymer was precipitated and washed in diethyl ether/dichloromethane 1/1 (45 ml) and then dried under reduced pressure. This gave 691 mg (2.85 mmol, 95%) of 4 as a white solid, 2.1.4 Production of an Electrode with poly-(2-vinylthianthrene) 3

3 was processed in a mortar to give a fine powder. Subsequently added to 30 mg of 3 and 10 mg of poly(vinylidene fluoride) (PVDF; Sigma Aldrich as binder additive) was 1 ml of NMP, and the mixture was stirred for 16 h. This suspension was added to 60 mg of SuperP® (carbon black, carbon particles) and the mixture was mixed in a mortar for ten minutes until a homogeneous paste formed. This paste was applied to an aluminium foil (15 μm, MIT Corporation), The resultant electrode was dried at 45° C. under reduced pressure for 16 hours. The proportion of the active material on the electrodes was determined on the basis of the masses of dried electrodes, The button cells (2032 type) were constructed under an argon atmosphere. Suitable electrodes were punched out with the aid of an MIT Corporation Precision Disc Cutter (diameter 15 mm). The electrode being used as cathode was positioned at the base of the button cell and separated from the lithium anode with the aid of a porous polypropylene membrane (Celgard, MIT Corporation). Subsequently positioned atop the lithium anode were a stainless steel weight (diameter: 15.5 mm, thickness: 0.3 mm, MIT Corporation) and a stainless steel spring (diameter: 14.5 mm, thickness: 5 mm). The button cell was filled with electrolyte (EC/DMC 3/7 v/v, 0.5 M $LiClO_4$) and covered with the lid before being sealed with an electrical compression machine (MIT Corporation MSK-100D), The battery shows a discharge plateau at 3.9 V (FIG. 2).

In the first charge/discharge cycle, the battery shows a capacity of 103 mAh/g (93% of the theoretically possible capacity); atter 250 charge/discharge cycles, the battery shows a capacity of 81 mAh/g (FIG. 2).

2.1.5 Production of an Electrode with poly-(2-vinylthianthrene-co-divinylbenzene) 4

4 was processed in a mortar to give a fine powder. Subsequently added to 400 mg of 4 and 50 mg of poly(vinylidene fluoride) (PVDF: Sigma Aldrich as binder additive) was 10 ml of NMP, and the substances were dissolved in a dissolver at 2000 rpm at 50° C. To this solution were added 550 g of SuperP® (carbon particles) and, if required, NMP, and the mixture was mixed at 8000 rpm for 30 min. The paste obtained was applied to an aluminium foil (15 μm, MIT Corporation). The resultant electrode was dried at 40° C. under reduced pressure for 24 hours, The proportion of the active material on the electrodes was determined on the basis of the masses of dried electrodes. The button cells (2032 type) were constructed under an argon atmosphere. Suitable electrodes were punched out with the aid of an MIT Corporation Precision Disc Cutter (diameter 15 mm). The electrode being used as cathode was positioned at the base of the button cell and separated from the lithium anode with the aid of a porous polypropylene membrane (Celgard, MIT Corporation). Subsequently positioned atop the lithium anode were a stainless steel weight (diameter: 15.5 mm, thickness: 0.3 mm, MIT Corporation) and a stainless steel spring (diameter: 14.5 mm, thickness: 5 mm). The button cell was filled with electrolyte (EC/DMC 3/7 v/v, 1 M $LiClO_4$) and covered with the lid before being sealed with an electrical compression machine (MIT Corporation MSK-100D).

The battery shows a discharge plateau at 3.9 V (FIG. 3).

In the first charge/discharge cycle, the battery shows a capacity of ~103 mAh/g; after 250 charge/discharge cycles, the battery shows a capacity of ~85 mAh/g (FIG. 3).

3. Results

The value of 81 mAh/g after 250 charge/discharge cycles observed in the case of the inventive polymer 3 (section 2.1.4) shows that the polymers according to the invention are superior to those from the prior art, namely those described by Speer et al. that are based on a norbornenyl backbone. As shown in FIG. 4 (page 15263) of Speer et al., the battery produced with the prior art polymer has a maximum specific capacity of ~63 mAh/g. This value is below the value of 81 mAh/g which is still obtained with the polymer according to the invention after 250 charge/discharge cycles. This shows that the polymers according to the invention permit higher discharge voltages and higher cycling stability. This was completely surprising,

The invention claimed is:
1. A redox-active electrode material for electrical charge storage, comprising:
a polymer P which comprises n mutually joined repeat units of the chemical structure (I)

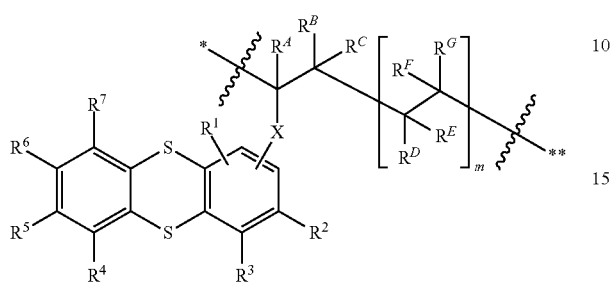

(I)

wherein n is an integer ≥4,
wherein m is an integer ≥0,
wherein the repeat units of the chemical structure (I) within the polymer P are the same or at least partly different from one another,
wherein the repeat units of the chemical structure (I) within the polymer P are joined to one another in such a way that the bond identified by "*" in a particular repeat unit is joined to the bond identified by "**" in an adjacent repeat unit,
wherein $R^A$, $R^B$, $R^C$, $R^D$, $R^E$, $R^F$, $R^G$, $R^1$, $R^2$, $R^3$, $R^4$, $R^5$, $R^6$, $R^7$ radicals are each independently selected from the group consisting of hydrogen, —$NO_2$, —CN, -halogen, —$COOR^8$, —C(=O)$NHR^9$, —$NR^{10}R^{11}$, —$OR^{12}$, —$SR^{13}$, —OP(=O)($O^-(M^{z+})_{1/z})_2$, —OP(=O)($OR^{14}$)$O^-(M^{z+})_{1/z}$, —OP(=O)($OR^{15}$)($OR^{16}$), —S(O)$_2O^-$($M^{z+})_{1/z}$, —S(O)$_2OR^{17}$, substituted or unsubstituted (hetero)aromatic radical, and substituted or unsubstituted aliphatic radical optionally comprising at least one group selected from the group consisting of ether, thioether, amino ether, carbonyl, carboxylic ester, sulphonic ester, and phosphoric ester,
wherein $R^8$, $R^9$, $R^{10}$, $R^{11}$, $R^{12}$, $R^{13}$, $R^{14}$, $R^{15}$, $R^{16}$, $R^{17}$ are each independently selected from the group consisting of hydrogen, substituted or unsubstituted (hetero)aromatic radical, and substituted or unsubstituted aliphatic radical optionally comprising at least one group selected from the group consisting of ether, thioether, amino ether, carbonyl, carboxylic ester, sulphonic ester, and phosphoric ester,
wherein $M^{z+}$ is selected from the group consisting of metallic cation, and organic cation,
wherein z indicates the number of positive charges of $M^{z+}$,
wherein at least two radicals in ortho positions to one another among the $R^1$, $R^2$, $R^3$ radicals and/or at least two radicals in ortho positions to one another among the $R^4$, $R^5$, $R^6$, $R^7$ radicals may each also be bridged by at least one substituted or unsubstituted (hetero)aromatic ring or by a substituted or unsubstituted aliphatic ring optionally comprising at least one group selected from the group consisting of ether, thioether, amino ether, carbonyl, carboxylic ester, sulphonic ester, and phosphoric ester,
wherein X is selected from the group consisting of &-$(X^1)$p1-$[C=Y^1]$q1-$(X^2)$p2-B -$(X^3)$p3-$[C=Y^2]$q2-$(X^4)$p4-&&, &-$(X^5)$p5-$(C=Y^3)$q3-$(X^6)$p6-&&, and direct bond, wherein,
p1, q1, p2 are each 0 or 1, with the proviso that it is not simultaneously true that p1=p2=1 and q1=0,
p3, q2, p4 are each 0 or 1, with the proviso that it is not simultaneously true that p3=p4=1 and q2=0,
p5, q3, p6 are each 0 or 1, with the proviso that it is not simultaneously true that p5=p6=1 and q3=0, and that, when p5=1 and q3=0, p6=0, and that it is not true that p5=q3=p6=0,
$Y^1$, $Y^2$, $Y^3$ are each independently selected from O, and S,
$X^1$, $X^2$, $X^3$, $X^4$, $X^5$, $X^6$ are each independently selected from —O—, —S—, —NH—, and —Nalkyl-,
B is a divalent substituted or unsubstituted (hetero) aromatic radical or a divalent substituted or unsubstituted aliphatic radical optionally comprising at least one group selected from the group consisting of ether, thioether, amino ether, carbonyl, carboxylic ester, sulphonic ester, and phosphoric ester,
"&" denotes the bond to the carbon atom joined to $R^A$, and
"&&" denotes the bond to a thianthrene ring.
2. The redox-active electrode material for electrical charge storage according to claim 1,
wherein the $R^A$, $R^B$, $R^C$, $R^D$, $R^E$, $R^F$, $R^G$, $R^1$, $R^2$, $R^3$, $R^4$, $R^5$, $R^6$, $R^7$ radicals are each independently selected from the group consisting of hydrogen, —CN, -halogen, —$COOR^8$, —C(=O)$NHR^9$, —$NR^{10}R^{11}$, —$OR^{12}$, —$SR^{13}$, —OP(=O)($O^-(M^{z+})_{1/z})_2$, —OP(=O)($OR^{14}$)$O^-(M^{z+})_{1/z}$, —OP(=O)($OR^{15}$)($OR^{16}$), —S(O)$_2O^-$($M^{z+})_{1/z}$, —S(O)$_2OR^{17}$, substituted or unsubstituted (hetero)aromatic radical, and substituted or unsubstituted aliphatic radical optionally comprising at least one group selected from the group consisting of ether, thioether, and sulphonic,
wherein $R^8$, $R^9$, $R^{10}$, $R^{11}$, $R^{12}$, $R^{13}$, $R^{14}$, $R^{15}$, $R^{16}$, $R^{17}$ are each independently selected from hydrogen, substituted or unsubstituted (hetero)aromatic radical, and substituted or unsubstituted aliphatic radical optionally comprising at least one group selected from ether, thioether, and sulphonic ester,
wherein $M^{z+}$ is selected from the group consisting of alkali metal cation, alkaline earth metal cation, transition metal cation, tetraalkylammonium cation, imidazolium cation, monoalkylimidazolium cation, and dialkylimidazolium cation,
wherein at least two radicals in ortho positions to one another among the $R^1$, $R^2$, $R^3$ radicals and/or at least two radicals in ortho positions to one another among the $R^4$, $R^5$, $R^6$, $R^7$ radicals may each also be bridged by at least one substituted or unsubstituted (hetero)aromatic ring or by a substituted or unsubstituted aliphatic ring optionally comprising at least one group selected from the group consisting of ether, thioether, and sulphonic ester,
and wherein B is a divalent substituted or unsubstituted (hetero)aromatic radical or a divalent substituted or unsubstituted aliphatic radical optionally comprising at least one group selected from the group consisting of ether, thioether, and sulphonic ester.
3. The redox-active electrode material for electrical storage according to claim 2,
wherein the $R^A$, $R^B$, $R^C$, $R^D$, $R^E$, $R^F$, $R^G$ radicals are each independently selected from the group consisting of hydrogen, —CN, -halogen, —$COOR^8$, —C(=O)$NHR^9$, —$NR^{10}R^{11}$, —$OR^{12}$, —$SR^{13}$, substituted or unsubstituted phenyl radical, and substituted or unsubstituted aliphatic radical optionally comprising at least one group selected from the group consisting of ether, thioether, and sulphonic ester, wherein the $R^1$, $R^2$, $R^3$, $R^4$, $R^5$, $R^6$, $R^7$ radicals are each independently selected from the group consisting of hydrogen, —CN, -halogen, —COOR$^{18}$, —OR$^{22}$, —SR$^{23}$, —OP(=O)(O$^-$(M$^{z+}$)$_{1/z}$)$_2$, —OP(=O)(OR$^{24}$)O$^-$(M$^{z+}$)$_{1/z}$, —OP(=O)(OR$^{25}$)(OR$^{26}$), —S(O)$_2$O$^-$(M$^{z+}$)$_{1/z}$, —S(O)$_2$OR$^{27}$, substituted or unsubstituted (hetero)aromatic radical, and substituted or unsubstituted aliphatic radical optionally comprising at least one group selected from the group consisting of ether, thioether, and sulphonic ester, wherein $R^8$, $R^9$, $R^{10}$, $R^{11}$, $R^{12}$, $R^{13}$, $R^{18}$, $R^{22}$, $R^{23}$, $R^{24}$, $R^{25}$, $R^{26}$, $R^{27}$ are each independently selected from hydrogen, substituted or unsubstituted (hetero)aromatic radical, and substituted or unsubstituted aliphatic radical optionally comprising at least one group selected from the group consisting of ether, thioether, and sulphonic ester, wherein M$^{z+}$ is selected from the group consisting of Li$^+$, Na$^+$, K$^+$, Mg$^{2+}$, Ca$^{2+}$, Zn$^{2+}$, Fe$^{2+}$, Fe$^{3+}$, Cd$^{2+}$, Hg$^+$, Hg$^{2+}$, Ni$^{2+}$, Ni$^{3+}$, Ni$^{4+}$, tetraalkylammonium cation, imidazolium cation, monoalkylimidazolium cation, and dialkylimidazolium cation, wherein the alkyl groups in the tetraalkylammonium cation, monoalkylimidazolium cation, and dialkylimidazolium cation each independently have 1 to 10 carbon atoms, wherein at least two radicals in ortho positions to one another among the $R^1$, $R^2$, $R^3$ radicals and/or at least two radicals in ortho positions to one another among the $R^4$, $R^5$, $R^6$, $R^7$ radicals may each also be bridged by at least one substituted or unsubstituted (hetero)aromatic ring or by a substituted or unsubstituted aliphatic ring optionally comprising at least one group selected from the group consisting of ether, thioether, and sulphonic ester, wherein $Y^1$, $Y^2$, $Y^3$ are each independently selected from O, and S, $X^1$, $X^2$, $X^3$, $X^4$, $X^5$, $X^6$ are each independently selected from —O—, and —S—, B is a divalent substituted or unsubstituted (hetero)aromatic radical or a divalent substituted or unsubstituted aliphatic radical optionally comprising at least one group selected from ether, and thioether.

4. The redox-active electrode material for electrical charge storage according to claim 3, wherein the $R^A$, $R^B$, $R^C$, $R^D$, $R^E$, $R^F$, $R^G$ radicals are each independently selected from the group consisting of hydrogen, —CN, -halogen, —COOR$^8$, —OR$^{12}$, —SR$^{13}$, substituted or unsubstituted phenyl radical, and substituted or unsubstituted alkyl radical optionally comprising at least one group selected from ether, and thioether, wherein the $R^1$, $R^2$, $R^3$, $R^4$, $R^5$, $R^6$, $R^7$ radicals are each independently selected from the group consisting of hydrogen, -halogen, —COOR$^{18}$, —OR$^{22}$, —SR$^{23}$, —OP(=O)(O$^-$(M$^{z+}$)$_{1/z}$)$_2$, —OP(=O)(OR$^{24}$)O$^-$(M$^{z+}$)$_{1/z}$, —OP(=O)(OR$^{25}$)(OR$^{26}$), —S(O)$_2$O$^-$(M$^{z+}$)$_{1/z}$, —S(O)$_2$OR$^{27}$, and substituted or unsubstituted alkyl radical optionally comprising at least one group selected from ether, thioether, and sulphonic ester, wherein $R^8$, $R^{12}$, $R^{13}$, $R^{18}$, $R^{22}$, $R^{23}$, $R^{24}$, $R^{25}$, $R^{26}$, $R^{27}$ are each independently selected from hydrogen, substituted or unsubstituted (hetero)aromatic radical, and substituted or unsubstituted alkyl radical optionally comprising at least one group selected from the group consisting of ether, thioether, and sulphonic ester, wherein M$^{z+}$ is selected from the group consisting of Li$^+$, Na$^+$, K$^+$, Mg$^{2+}$, Ca$^{2+}$, Zn$^{2+}$, Fe$^{2+}$, Fe$^{3+}$, Cd$^{2+}$, Hg$^+$, Hg$^{2+}$, Ni$^{2+}$, Ni$^{3+}$, Ni$^{4+}$, wherein B is a divalent substituted or unsubstituted (hetero)aromatic radical or a divalent substituted or unsubstituted alkylene or alkenylene radical optionally comprising at least one group selected from ether, and thioether.

5. The redox-active electrode material for electrical charge storage according to claim 4, wherein the $R^A$, $R^B$, $R^C$, $R^D$, $R^E$, $R^F$, $R^G$ radicals are each independently selected from the group consisting of hydrogen, —CN, -halogen, —COOR$^8$, substituted or unsubstituted phenyl radical, and substituted or unsubstituted alkyl radical, wherein the $R^1$, $R^2$, $R^3$, $R^4$, $R^5$, $R^6$, $R^7$ radicals are each independently selected from the group consisting of hydrogen, -halogen, —COOR$^{18}$, —OR$^{22}$, —SR$^{23}$, and substituted or unsubstituted alkyl radical, wherein $R^8$, $R^{18}$, $R^{22}$, $R^{23}$ are each independently selected from hydrogen, and substituted or unsubstituted alkyl radical, wherein B is selected from the group consisting of phenylene, tolylene, and divalent substituted or unsubstituted alkylene or alkenylene radical.

6. The redox-active electrode material for electrical charge storage according to claim 5, wherein, the $R^A$, $R^B$, $R^C$, $R^E$, $R^F$ radicals are each independently selected from the group consisting of hydrogen, -halogen, and alkyl radical, the $R^D$, $R^G$ radicals are independently selected from the group consisting of hydrogen, -halogen, alkyl radical, —COOR$^8$, and phenyl radical unsubstituted or substituted by a group selected from alkyl, alkenyl, and of —CN, the $R^1$, $R^2$, $R^3$, $R^4$, $R^5$, $R^6$, $R^7$ radicals are each independently selected from the group consisting of hydrogen, -halogen, —COOR$^{18}$, —OR$^{22}$, —SR$^{23}$, and alkyl radical, $R^8$, $R^{18}$, $R^{22}$, $R^{23}$ are each independently selected from hydrogen, and alkyl radical, wherein X is selected from the group consisting of &-(X$^1$)p1-[C=Y$^1$]q1-(X$^2$)p2-B-(X$^3$)p3-[C=Y$^2$]q2-(X$^4$)p4-&&, and direct bond, wherein B is selected from the group consisting of phenylene, tolylene, alkylene radical, and alkenylene radical.

7. The redox-active electrode material for electrical charge storage according to claim 6, wherein, the $R^A$, $R^B$, $R^C$, $R^E$, $R^F$ radicals are each independently selected from the group consisting of hydrogen, —F, and —Cl, the $R^D$, $R^G$ radicals are independently selected from the group consisting of hydrogen, —F, —Cl, phenyl, and phenyl radical substituted by at least one vinyl group, wherein the $R^1$, $R^2$, $R^3$, $R^4$, $R^5$, $R^6$, $R^7$ radicals are each independently selected from the group consisting of hydrogen, —F, —Cl, —OR$^{22}$, —SR$^{23}$, and alkyl radical having 1 to 6 carbon atoms, $R^{22}$, $R^{23}$ are each independently selected from alkyl radical having 1 to 6 carbon atoms, wherein X is selected from the group consisting of direct bond, &-O—CH=CH-&&, &-CH=CH—O-&&, &-O—CH$_2$—CH=CH-&&, &-CH=CH—CH$_2$—O-&&, phenylene, & -CH$_2$-phenylene-&&, &-phenylene-CH$_2$-&&, and alkylene having 1 to 6 carbon atoms.

8. The redox-active electrode material for electrical charge storage according to claim 1, wherein n is an integer ≥4 and ≤5000 and m is an integer ≥0 and ≤5000.

9. The redox-active electrode material for electrical storage according to claim 1, further comprising a conductivity additive.

10. The redox-active electrode material for electrical charge storage according to claim 9, wherein the conductivity additive is at least one material selected from the group consisting of carbon materials, electrically conductive polymers, metals, semimetals, and (semi)metal compounds.

11. The redox-active electrode material for electrical charge storage according to claim 9, further comprising a binder additive.

12. The redox-active electrode material for electrical charge storage according to claim 11, wherein the binder additive is at least one binder additive selected from the group consisting of polytetrafluoroethylene, polyvinylidene fluoride, polyhexafluoropropylene, polyvinyl chloride, polycarbonate, polystyrene, polyacrylates, polymethacrylates, polysulphones, cellulose derivatives, and polyurethanes.

13. An electrode comprising the redox-active electrode material for electrical charge storage according to claim 9.

14. An electrical charge storage device, comprising the electrode according to claim 13.

15. A method of preparing a redox-active electrode, comprising:
   at least partially coating at least one surface layer of a substrate with the redox-active electrode material of claim 1.

16. The electrical charge storage device according to claim 14, wherein said device is a secondary battery.

* * * * *

UNITED STATES PATENT AND TRADEMARK OFFICE
CERTIFICATE OF CORRECTION

PATENT NO. : 10,608,255 B2
APPLICATION NO. : 16/306614
DATED : March 31, 2020
INVENTOR(S) : Andreas Wild, Ulrich Schubert and Bernhard Häupler It is certified that error appears in the above-identified patent and that said Letters Patent is hereby corrected as shown below:

On the Title Page

Item (56) References Cited, should be listed as follows:
-- 4,999,263    3/1991   Kabata et al. --

Signed and Sealed this
Twelfth Day of May, 2020

Andrei Iancu
*Director of the United States Patent and Trademark Office*